United States Patent
Takasaki et al.

(10) Patent No.: US 6,367,254 B1
(45) Date of Patent: Apr. 9, 2002

(54) MASTER CYLINDER

(75) Inventors: Yoshiyasu Takasaki; Yasushi Mori, both of Saitama-Ken; Mamoru Sawada, Aichi-Pref; Kazuya Maki, Aichi-Pref; Hiroaki Niino, Aichi-Pref, all of (JP)

(73) Assignees: Bosch Braking Systems Co., Ltd., Tokyo; Denso Corporation, Kariya, both of (JP)

(*) Notice: Subject to any disclaimer, the term of this patent is extended or adjusted under 35 U.S.C. 154(b) by 0 days.

(21) Appl. No.: 09/561,398

(22) Filed: Apr. 28, 2000

(30) Foreign Application Priority Data

May 27, 1999 (JP) .......................................... 11-148073

(51) Int. Cl.[7] .............................................. B60T 13/12
(52) U.S. Cl. ........................................ 60/548; 60/554
(58) Field of Search ............................... 60/547.1, 548, 60/554, 593

(56) References Cited

U.S. PATENT DOCUMENTS

| | | | | |
|---|---|---|---|---|
| 2,865,335 A | * | 12/1958 | Lewis | 91/372 |
| 2,957,311 A | * | 10/1960 | Stelzer | 60/548 |
| 3,490,231 A | * | 1/1970 | Klein | 60/548 |
| 3,638,426 A | * | 2/1972 | Belart | 60/548 |
| 4,441,319 A | * | 4/1984 | Brown | 60/548 |
| 4,458,490 A | * | 7/1984 | Newhouse | 60/548 |

FOREIGN PATENT DOCUMENTS

GB 2070167 * 1/1981 ............... 60/547.1

* cited by examiner

Primary Examiner—F. Daniel Lopez
Assistant Examiner—Igor Kershteyn
(74) Attorney, Agent, or Firm—Flynn, Thiel, Boutell & Tanis, P.C.

(57) ABSTRACT

A master cylinder which includes a primary piston and a thrust piston disposed within a housing, and defines an intensifying chamber at a location rearward of the thrust piston. An input shaft has a front end which is disposed within the intensifying chamber. The thrust piston is formed with a communication path (discharge passage), and a control valve is disposed between the thrust piston and the front end of the input shaft to open or close the communication path (discharge passage). When the input shaft is driven forward under the inoperative condition shown and the pump is operated to introduce a discharge pressure from the pump into the intensifying chamber, a liquid pressure is generated in the intensifying chamber and drives the primary piston forward, generating a liquid pressure in a liquid pressure chamber. In this manner, a master cylinder can be provided which has a simple and inexpensive construction with a reduced number of parts and which is compact in size. The master cylinder is capable of providing an increased braking force as required by intensifying a master cylinder pressure.

43 Claims, 12 Drawing Sheets

MASTER CYLINDER

FIELD OF THE INVENTION

The present invention relates to a master cylinder, and more particularly, to a master cylinder capable of obtaining an increased braking force by intensifying a master cylinder pressure when required.

DESCRIPTION OF THE PRIOR ART

A braking system for automobiles which is found in the prior art is provided with a booster which utilizes a fluid pressure such as a negative pressure or a liquid pressure to boost an input to a given magnitude so that the increased output from the booster acts upon a master cylinder to cause it to produce a master cylinder pressure, thereby allowing a braking force of an increased magnitude to be obtained in response to a force of a small magnitude with which a brake pedal is depressed.

A conventional brake system incorporating a negative pressure booster utilizes a negative pressure which obtains in an engine. However, with a recent trend toward a lower fuel cost of the engine, the magnitude of the negative pressure which is developed in the engine is reduced with a consequent reduction in the output from the negative pressure booster. Such a reduction in the output may be compensated for by providing a negative pressure booster of an increased size, but it is difficult to provide a space in an engine room which accommodates a negative pressure booster of an increased size.

On the other hand, a brake incorporating a liquid pressure booster requires components such as a pump or an accumulator, disadvantageously leading to a cost increase of the overall system.

It is desirable for a brake system of the kind described to develop a braking force of an increased magnitude more rapidly during a quick braking operation than in a normal, more gentle braking operation.

It is recognized that a quick braking operation has a need for the development of an increased braking force. Nevertheless an unexperienced driver such as a beginner of driving an automobile may not be able to depress a brake pedal deep enough to develop an increased braking force. In such an instance, it is desirable that an assistance be afforded, even to an unexperienced driver, to enable him to develop an increased braking force in a reliable manner.

SUMMARY OF THE INVENTION

The present invention has been made in view of the foregoing and has for its object the provision of a master cylinder having a reduced number of parts with a simple and inexpensive construction to allow a reduction in its size while allowing an increased braking force to be obtained by intensifying a master cylinder pressure when necessary.

Specifically, according to a first aspect of the present invention defined in Claim 1, there is provided a master cylinder comprising a master cylinder piston slidably fitted into a housing to generate a master cylinder pressure, a thrust piston slidably fitted into the housing and disposed in abutment against the rear side of the master cylinder piston, an intensifying chamber defined within the housing rearwardly of the thrust piston, an input shaft adapted to move back and forth in interlocked relationship with a brake operating member, a source of liquid pressure adapted to be brought into communication with the intensifying chamber as required, a discharge passage providing a communication between the intensifying chamber and a reservoir for discharging an operating liquid in the intensifying chamber into the reservoir, and a control valve responsive to the input shaft to cause a liquid pressure to be generated in the intensifying chamber in accordance with an input applied to the input shaft by regulating a quantity of the operating liquid which is discharged from the intensifying chamber into the reservoir through the discharge passage, the discharge passage having an opening toward the intensifying chamber which is formed in the thrust piston, the opening cooperating with the front end of the input shaft to define the control valve.

According to a second aspect of the present invention defined in Claim 2, there is provided a master cylinder comprising a master cylinder piston slidably fitted into a housing to generate a master cylinder pressure, a thrust piston slidably fitted into the housing and disposed in abutment against the rear side of the master cylinder piston, an intensifying chamber defined within the housing rearwardly of the thrust piston, an input shaft adapted to move back and forth in interlocked relationship with a brake operating member, a source of liquid pressure adapted to be brought into communication with the intensifying chamber as required, a discharge passage providing a communication between the intensifying chamber and a reservoir for discharging an operating liquid in the intensifying chamber into the reservoir, and a control valve responsive to the input shaft to cause a liquid pressure to be generated in the intensifying chamber in accordance with an input applied to the input shaft by regulating a quantity of the operating liquid which is discharged from the intensifying chamber into the reservoir through the discharge passage, the thrust piston and the input shaft being in a slidable engagement while maintaining a liquid tightness therebetween, a valve chamber being defined between the thrust piston and the input shaft, the discharge passage extending through the valve chamber, the control valve being disposed in the valve chamber to open or close the discharge passage.

According to a third aspect of the invention defined in Claim 3, there is provided a master cylinder comprising a master cylinder piston slidably fitted into a housing to generate a master cylinder pressure, an intensifying chamber defined within the chamber rearwardly of the master cylinder piston, an input shaft adapted to move back and forth in interlocked relationship with a brake operating member, a source of liquid pressure adapted to be brought into communication with the intensifying chamber as required, a discharge passage providing a communication between the intensifying chamber and a reservoir for discharging an operating liquid in the intensifying chamber into the reservoir, and a control valve responsive to the input shaft to cause a liquid pressure to be generated in the intensifying chamber in accordance with an input applied to the input shaft by regulating a quantity of the operating liquid which is discharged from the intensifying chamber into the reservoir through the discharge passage, the master cylinder piston and the input shaft being in a slidable engagement while maintaining a liquid tightness therebetween, a valve chamber being defined between the master cylinder piston and the input shaft, the discharge passage passing extending through the valve chamber, the control valve being disposed in the valve chamber to open or close the discharge passage.

With the described arrangement, the housing contains the intensifying chamber and the control valve which controls the liquid pressure introduced into the chamber, thus providing a simple and inexpensive construction with a reduced number of parts and allowing a reduction in size and allowing an increased braking force to be obtained by intensifying the master cylinder pressure.

Above and other objects, features and advantages of the invention will become apparent from the following description of the embodiments thereof with reference to the attached drawings.

DETAILED DESCRIPTION OF THE EMBODIMENTS

Figure 1:
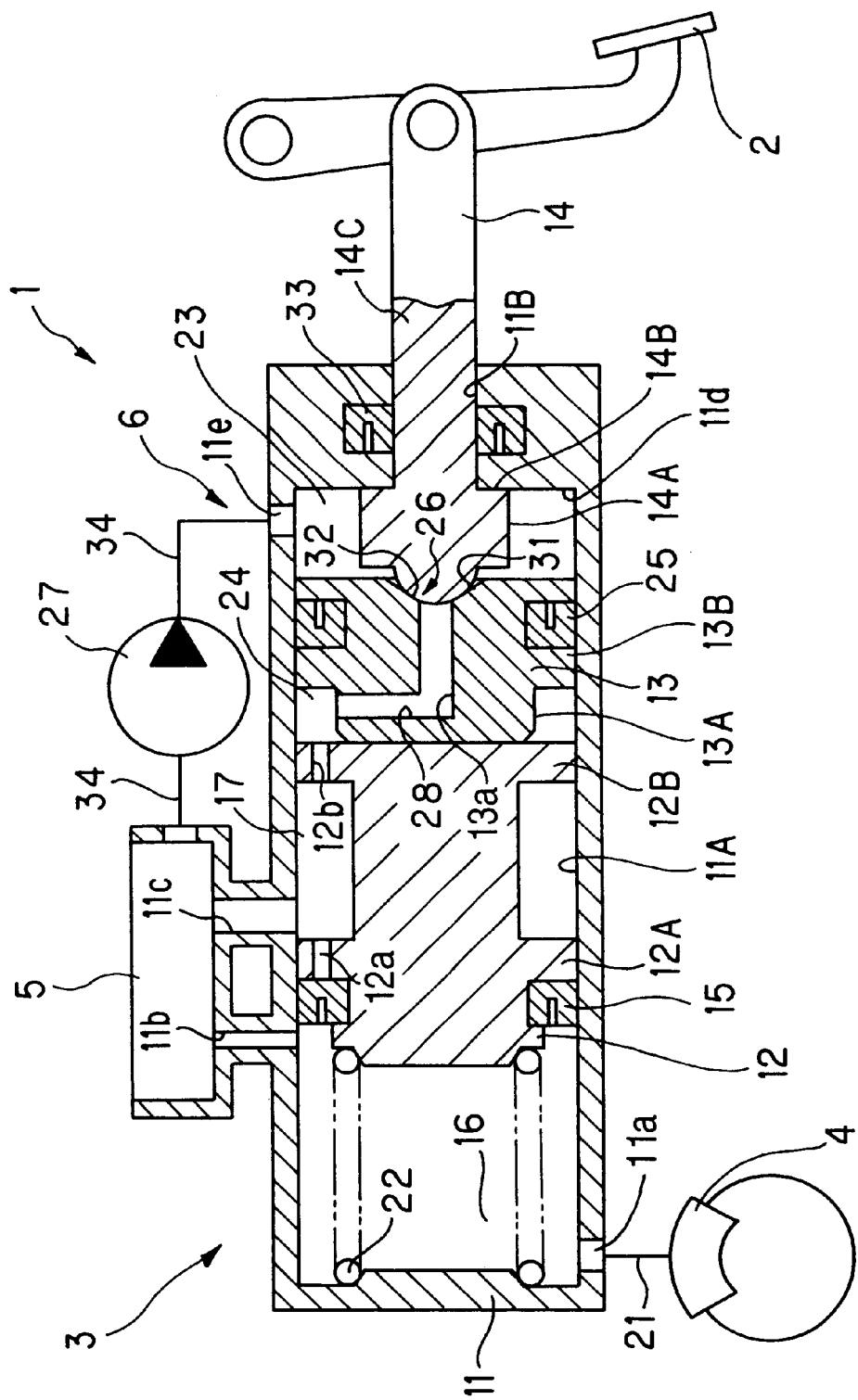
FIG. 1 is a cross section of a first embodiment of the invention.

Several embodiments of the invention will be now be described with reference to the drawings. Referring to FIG. 1, a brake system 1 according to the present invention comprises a master cylinder 3 which is operated upon in response to the depression of a brake pedal 2 to generate a master cylinder pressure, a wheel cylinder 4 which is supplied with the master cylinder pressure from the master cylinder 3, a reservoir 5 of braking liquid and intensifying means 6 disposed rearward of the master cylinder 3 for intensifying the master cylinder pressure when necessary.

The master cylinder 3 of the present embodiment includes a primary piston 12 and a thrust piston 13 which are disposed within a housing 11, and an input shaft 14 which is disposed rearward of the thrust piston 13.

The housing 11 has an axial bore 11A of an increased diameter and a bore 11B of a reduced diameter which continues from the bore 11A and opens into the rear end face.

Toward its front end, the primary piston 12 is formed with a first flange 12A around its outer periphery, and is also formed with a second flange 12B around its outer periphery at its rear end. At a location adjacent to and forwardly of the first flange 12A, the outer periphery of the primary piston 12 is formed with an annular groove, in which the inner periphery of an annular first cup seal 15 is fitted, with the rear end face of the first cup seal 15 being held in tight contact with the front end face of the first flange 12A.

The both flanges 12A, 12B of the primary piston 12 and the outer periphery of the first cup seal 15 are sidably fitted into the bore 11A of an increased diameter of the housing 11. An internal space within the bore 11A which is located forwardly of the first cup seal 15 defines a liquid pressure chamber 16 while an internal space in the bore 11A which is located between the both flanges 12A, 12B defines a first annular passage 17.

A braking liquid is introduced into the liquid pressure chamber 16, which is normally in communication with the wheel cylinder 4 through a discharge port 11a formed in the housing 11 and a conduit 21 connected thereto. In addition, the liquid pressure chamber 16 can communicate with the reservoir 5 through a radial passage 11b formed in the housing 11.

A spring 22 is disposed within the liquid pressure chamber 16 and extends between the front end face of the primary piston 12 and the opposing end face of the bore 11A, thereby normally urging the primary piston 12 rearward into abutment against the thrust piston 13, thus normally urging the primary piston 12 and the thrust piston 13 rearward in this manner.

The first annular passage 17 normally communicates with the reservoir 5 through a radial passage 11c formed in the housing 11, and accordingly, a braking liquid of an atmospheric pressure is introduced into the passage 17. The first flange 12A of the primary piston 12 is formed with an axial opening 12a which communicates between the opposed sides of the flange. The first cup seal 15 is channel-shaped in section. Accordingly, a flow of braking liquid from the first annular passage 17 into the liquid pressure chamber 16 is permitted while a flow of braking liquid in the opposite direction or from the liquid pressure chamber 16 into the first annular passage 17 is blocked.

The thrust piston 13 is in the form of a stepped solid cylinder having a front section 13A of a reduced diameter and a rear section 13B of an increased diameter. The section 13B of an increased diameter of the thrust piston 13 is slidably fitted into the bore 11A of an increased diameter which is located rearward of the primary piston 12, and the front end face of the thrust piston 13 abuts against the rear end face of the primary piston 12 as mentioned above.

An internal space within the bore 11A of an increased diameter which is located rearward of the thrust piston 13 defines an intensifying chamber 23, into which a front portion 14A of an increased diameter of an input shaft 14 extends.

At a location outward of the section 13A of a reduced diameter of the thrust piston 13, a second annular passage 24 is defined by a space located between the rear end face of the primary piston 12 and the opposing stepped end face of the thrust piston 13. The second annular passage 24 normally communicates with the first annular passage 17 through an axial opening 12b formed in the second flange 12B of the primary piston 12, whereby the braking liquid in the reservoir 5 is normally introduced into the second annular passage 24 through the radial passage 11c, the first annular passage 17 and the axial opening 12b.

An annular second cup seal 25 which is C-shaped in section is fitted into the outer periphery of the section 13B of an increased diameter of the thrust piston 13 while the outer periphery of the second cup seal 25 is held in tight contact with the inner peripheral surface of the bore 11A of an increased diameter. Accordingly, a flow of braking liquid from the second annular passage 24 into the intensifying chamber 23 is permitted through a clearance between the outside of the second cup seal 25 and the inner peripheral surface of the bore 11A of an increased diameter, but a flow of braking liquid in the opposite direction is blocked. When a flow of braking liquid from the second annular passage 24 into the intensifying chamber 23 through the outside of the second cup seal 25 is permitted, the braking liquid is supplemented into the intensifying chamber to prevent it from assuming a negative pressure as the input shaft 14 and thrust piston 13 are driven forward to increase the volume of the intensifying chamber 23.

The primary piston 12 and the thrust piston 13 are normally urged rearward by the spring 22, whereby the input shaft 14 which abuts against a rear, axial portion of the thrust piston 13 is also normally urged rearward. In the inoperative condition where the brake pedal 2 is not depressed, the large diameter portion 14A of the input shaft 14 has its rear end face 14B disposed in abutment against a stepped end face 11d of the bore 11A of an increased diameter of the housing 11, whereby the retracted end positions of the primary piston 12, the thrust piston 13 and the input shaft 14 under the inoperative condition are defined.

Under this inoperative condition, the first cup seal 15 is located rearward of the inner end of the radial passage 11b formed in the housing 11, and accordingly, the liquid pressure chamber 16 communicates with the reservoir 5 and the braking liquid within the liquid pressure chamber 16 assumes an atmospheric pressure.

By contrast, when the brake pedal 2 is depressed and the input shaft 14 is driven forward, the primary piston 12 and the thrust piston 13 are also driven forward. Thereupon, the first cup seal 15 closes the inner end of the radial passage 11b to interrupt the communication between the liquid pressure chamber 16 and the reservoir 5, thus generating a master cylinder pressure in the liquid pressure chamber 16 which acts upon the wheel cylinder 4 to develop a braking force.

What has been described above is an arrangement which is premised for the present embodiment, and according to the present embodiment, an arrangement is made so that a discharge pressure from a pump 27 may act upon the intensifying chamber 23 to intensify the master cylinder pressure as required and so that a control valve 26 disposed in a manner facing the intensifying chamber 13 can control the liquid pressure in the intensifying chamber 23 in accordance with an input.

Specifically, the thrust piston 13 is formed with an L-shaped communication path 13a which opens at its one end into the outer peripheral surface of the section 13A of a reduced diameter to communicate with the second annular passage 24 and which opens in the axial portion of the rear end face to communicate with the intensifying chamber 23 at its other end. A combination of the communication path 13a, the second annular passage 24, the axial opening 12b, the first annular passage 17 and the radial passage 11c constitutes a discharge passage 28. In this manner, a communication is allowed between the intensifying chamber 23 and the reservoir 5 through the discharge passage 28. The end of the communication path 13a which opens into the axial rear end of the thrust piston 13 is formed as a conical valve seat 31.

The input shaft 24 includes the portion 14A of an increased diameter at its front end which is shaped into a semi-spherical configuration serving as a valve element 32. The portion 14A of an increased diameter and the valve element 32 are located within the intensifying chamber 23, and the valve element 32 is disposed in opposing relationship with the valve seat 31. A movement of the valve element 32 into engagement with or disengagement from the valve seat 31 closes or opens the communication path 13a (discharge passage 28). Accordingly, the combination of the valve element 32 and the valve seat 31 constitutes the control valve 26.

Because the thrust piston 13 is normally urged rearward by the spring 22, the valve element 32 is seated upon the valve seat 31 to close the communication path 13a (discharge passage 28) in the inoperative condition shown. On the other hand, when the valve element 32 is removed from the valve seat 31, a communication is established between the intensifying chamber 23 and the reservoir 5 through the discharge passage 28, whereby the braking liquid in the intensifying chamber 23 can be discharged into the reservoir 5 through the discharge passage 28.

The input shaft 14 also includes a portion 14C of a reduced diameter which slidably extends through the bore 11B of a reduced diameter of the housing 11 to the outside thereof, the projecting end being connected to the brake pedal 2 by a pin. Intermediate its axial length, the bore 11B of a reduced diameter has an annular seal member 33 mounted thereon, thereby maintaining a liquid tightness between the inner peripheral surface of the bore 11B of the reduced diameter and the outer peripheral surface of the portion 14C of the reduced diameter of the input shaft 14.

An annular seat area of the valve seat 31 on which the valve element 32 becomes seated has an diameter which is less than the diameter of the portion 14C of the reduced diameter of the input shaft 14.

The intensifying chamber 23 communicates with the reservoir 5 through a radial opening 11e formed in the housing 11 and a conduit 34 connected thereto. The pump 27 is disposed in the conduit 34, and its operation is controlled by a controller, not shown. In the present embodiment, there are provided detecting means, not shown, which detect a force with which the brake pedal 2 is depressed and a rate of increase in the pedal stroke or the like, thus allowing the controller to operate the pump 27 in accordance with such results of detection by the detecting means.

When the brake pedal 2 is depressed under the inoperative condition shown to drive the input shaft 14 forward, the thrust piston 13 and the primary piston 12 are also driven forward to generate a master cylinder pressure in the liquid pressure chamber 16. The control valve 26 is closed under this condition, but when the controller operates the pump 27 under this condition, the discharge pressure from the pump 27 is introduced into the intensifying chamber 23. This produces a liquid pressure in the intensifying chamber 23, which is in turn effective to drive the thrust piston 13 and the primary piston 12 further forward, thus intensifying the master cylinder pressure in the liquid pressure chamber 16.

As mentioned previously, in the present embodiment, the annular seat area of the valve element 32 has a diameter which is less than the diameter of the portion 14C of a reduced diameter of the input shaft 14. Accordingly, the liquid pressure in the intensifying chamber 23 acting upon the cross-sectional area of the portion 14C of the reduced diameter from which the cross-sectional area of the seat area of the valve element 32 is subtracted serves as a reaction pushing back the input shaft 14. In this manner, the input shaft 14 is pushed back to open the control valve 26, whereby the braking liquid in the intensifying chamber 23 is discharged to the reservoir 5 through the discharge passage 28, in turn causing the opening of the control valve 26 (or the separation between the valve element 32 and the valve seat 31) to be reduced. In this manner, in the present embodiment, the control valve 26 controls the liquid pressure in the intensifying chamber 23 so that the input from the input shaft 14 is balanced with the reaction to the input shaft 14 which is produced by the liquid pressure in the intensifying chamber 23.

It will be seen from the forgoing description that in the present embodiment, the intensifying chamber 23, the control valve 26 and the pump 27 constitute together intensifying means 6.

Description of Operation

In the described arrangement, under the inoperative condition where the brake pedal 2 is not depressed, the various components of the brake system 1 assume their inoperative positions shown in FIG. 1. Under this condition, the pump 27 is not in operation. The primary piston 12, the thrust piston 13 and the input shaft 14 are maintained in their retracted positions where the end face 14B of the portion 14A of an increased diameter of the input shaft 14 abuts against the stepped end face 11d of the housing 11. In addition, the valve element 32 is seated upon the valve seat 31 to close the control valve 26. Since the braking liquid can flow from the second annular passage 17 to the intensifying chamber 23 through the outside of the second cup seal 25, the braking liquid in the intensifying chamber 23 assumes an atmospheric pressure. The liquid pressure chamber 16 communicates with the reservoir 5 through the radial passage 11b, and accordingly, no liquid pressure is generated therein.

Under the inoperative condition, if the controller inadvertently operates the pump 27 without depressing the brake pedal 2, the discharge pressure from the pump 27 acts upon the intensifying chamber 23 to generate a liquid pressure therein, whereby the thrust piston 13 and the primary piston 12 are driven forward. However, as the primary piston 12 moves forward, the valve element 32 becomes removed from the valve seat 31 to open the communication path 13a (discharge passage 28). Accordingly, a communication is established between the reservoir 5 and the intensifying chamber 23 through the discharge passage 28, whereby the liquid pressure in the intensifying chamber 23 returns to the atmospheric pressure immediately. As a consequence, a forward movement of the primary piston 12 is interrupted at a level which is insufficient to generate a master cylinder pressure in the liquid pressure chamber 16, and this condition is maintained.

Normal Brake Operation

When the brake pedal 2 is depressed gently under the inoperative condition, the input shaft 14 is driven forward, whereby the thrust piston 13 and the primary piston 12 are driven forward while maintaining the valve element 32 seated upon the valve seat 31.

As the primary piston 12 moves forward, the first cup seal 15 closes the inner end of the radial passage 11b in the housing 11, thus interrupting a communication between the liquid pressure chamber 16 and the reservoir 5. Accordingly, a master cylinder pressure is generated in the liquid pressure chamber 16, and is then supplied to the wheel cylinder 4, allowing a braking force to be obtained as usual.

As the primary piston 12 and the thrust piston 13 are driven forward, the volume of the intensifying chamber 23 increases, whereby it tends to assume a negative pressure. However, the braking liquid in the second annular passage 24 is supplemented to the intensifying chamber 23 through the outside of the second cup seal 25, and thus the atmospheric pressure is maintained in the intensifying chamber 23, allowing a smooth forward movement of the primary piston 12 and the thrust piston 13.

Release of Normal Operation

Subsequently when the brake pedal 2 is released, the input shaft 14 is initially returned to its inoperative position shown in FIG. 1.

As the input shaft 14 retracts, the valve element 32 becomes removed from the valve seat 31 to open the control valve 26. Accordingly, a communication is established between the intensifying chamber 23 and the reservoir 5 through the discharge passage 28, whereby the braking liquid in the intensifying chamber 23 is discharged into the reservoir 5 through the discharge passage 28 and the like. Thus, the primary piston 12 and the thrust piton 13 retract rearwardly under the influence of the master cylinder pressure in the liquid pressure chamber 16 and the resilience of the spring 22, returning to the inoperative condition shown where the valve element 32 abuts against the valve seat 31. The liquid pressure chamber then communicates with the reservoir 5 to assume the atmospheric pressure, and the brake system 1 assumes the inoperative condition shown, thus releasing the brake.

It is to be noted that the above description of operation covers a normal brake operation when no intensification of the master cylinder pressure takes place by means of the intensifying means.

Operation when Intensifying Means is Activated

As mentioned above, the present embodiment includes a controller, not shown, and also includes detecting means, not shown, which detect the force with which the brake pedal 2 is depressed and a rate of increase in the pedal stroke. Based on results of detection transmitted from the detecting means, the controller operates the pump 27 when it determines that there is a need of a brake assistance as for a quick braking operation as when a rate of increase in the pedal stroke or in the force of depressing the brake pedal 2 is higher than in a normal braking operation, for example.

Thus when the brake pedal 2 is rapidly depressed under the inoperative condition, the detecting means detect this, and transmits a corresponding signal to the controller. Thereupon the controller operates the pump 27, allowing the braking liquid to be fed to the intensifying chamber 23 through the conduit 34. At this time, the input shaft 14 assumes an advanced position and the control valve 26 is closed, whereby the intensifying chamber 23 is interrupted from the reservoir 5. As the discharge pressure from the pump 27 is supplied to the intensifying chamber 23, a liquid pressure is generated in the intensifying chamber 23 to drive the primary piston 12 and the thrust piston 13 forward. Accordingly, a master cylinder pressure of a higher magnitude than that obtained during a normal braking operation is generated in the liquid pressure chamber 16, and such master cylinder pressure is transmitted to the wheel cylinder to develop a braking force.

Because the liquid pressure in the intensifying chamber 23 acts to push the input shaft 14 rearward, the control valve 26 controls the liquid pressure in the intensifying chamber 23 so that the input from the input shaft 14 is balanced with a reaction upon the input shaft 14 which results from the liquid pressure in the intensifying chamber 23 as mentioned previously.

Denoting an input from the input shaft 14 by F, a liquid pressure in the intensifying chamber 23 by P0, the cross-sectional area of the portion 14C of the reduced diameter of the input shaft 14 by A1, and the cross-sectional area of the annular seat area of the control valve 26 (vale element 32) by A2, an equation which defines an equilibrium for the input shaft 14 is given as indicated below.

$$F = P0 * (A1 - A2) \tag{1}$$

On the other hand, denoting the cross sectional area of the primary piston 12 (or the second flange 12B) by A0, the master cylinder pressure (the liquid pressure in the liquid pressure chamber 16) by Pm and the resilience of the spring 22 by Sp, an equation which defines the equilibrium for the primary piston 12 is given as indicated below.

$$P0*(A0-A2)=Pm*A0+Sp \qquad (2)$$

From these equations, we have $$Pm=(F/A0)*(A0-A2)/(A1-A2)-Sp/A0$$

During the normal operation where the intensifying means 6 (pump 27) is not actuated, it will be seen that $$Pm=F/A0-Sp/A0$$

and thus it follows that the intensification ratio obtained when the intensifying means (pump 27) is activated is given by (A0−A2)/(A1−A2).

During a brake assistance in which the intensifying means 6 is activated, the master cylinder pressure can be intensified with an intensification ratio given above as compared with an normal operation where the intensifying means 6 (pump 27 ) is not activated, and this allows the brake assistance to be positively applied with the brake system 1 of the present embodiment. It will be seen that when the brake assistance is applied, the brake pedal 2 may be subsequently released, whereupon signals from the detecting means cause the controller to cease the operation of the pump 27.

Then, the input shaft 14 initially retracts to its inoperative position shown in FIG. 1 in the similar manner as when the brake pedal is released during the normal operation, thus causing the vale element 32 to remove from the valve seat 31 to open the control valve 26, whereby the braking liquid in the intensifying chamber 23 is discharged into the reservoir 5 through the discharge passage 28. Thus the braking liquid in the intensifying chamber 23 assumes the atmospheric pressure, and both the primary piston 12 and the thrust piston 13 retract rearward to their inoperative positions shown, thus releasing the brake.

As described above, the brake system 1 of the present embodiment includes intensifying means 6 which is disposed rearward of the master cylinder 3 and which is operative to intensify the master cylinder pressure to assure that a braking force of a increased magnitude be reliably obtained during a quick braking operation which requires a brake assistance. If a driver is unexperienced in driving an automobile such as a beginner, the intensifying means 6 assures that a braking force of increased magnitude be reliably obtained during a quick braking operation.

In the described embodiment, the intensifying means 6 intensifies the master cylinder pressure only when a brake assistance is required as during a quick braking operation. However, the intensifying means 6 may be activated anytime an intensification of the master cylinder pressure is required. To give an example, intensifying means 6 may be substantially used as a liquid pressure booster. In this instance, there may be provided detecting means which detects the depression of the brake pedal 2, and whenever the detecting means has detected the depression of the brake pedal 2, the controller may operate the pump 27. In this manner, the intensifying means 6 may be substantially used as a liquid pressure booster. This arrangement allows a liquid pressure booster to be provided which has a reduced number of parts and which is simple in construction as compared with a conventional liquid pressure booster.

As described, the primary piston 12 and the thrust piston 13 are urged rearward by the spring 22 to close the control valve 26. Accordingly, there is no occurrence of strange sound from a region of the control valve 26 if a car body is subject to oscillations.

The control valve 26 comprises the valve seat 31 and the vale element 32, and has a simple construction which can be reliably opened. If any foreign matter is held sandwiched between the value seat 31 and the valve element 32, the foreign matter can be discharged into the reservoir 6 through the discharge passage 28 when the control valve 26 is opened.

In the described embodiment, the valve element 32 is formed integrally with the input shaft 14, but it may be formed separately therefrom, thus improving the concentricity between the valve element 32 and the valve seat 31 and the liquid tightness of the control valve 26.

In the described embodiment, the thrust piston 13 is provided separately from the primary piston 12 and disposed rearward thereof. However, the primary piston 12 and the thrust piston 13 may be constructed as one piece, which may be treated as a primary piston. Again, functioning and advantages as achieved by the arrangement shown in FIG. 1 can be obtained with this construction.

Second Embodiment

Figure 2:
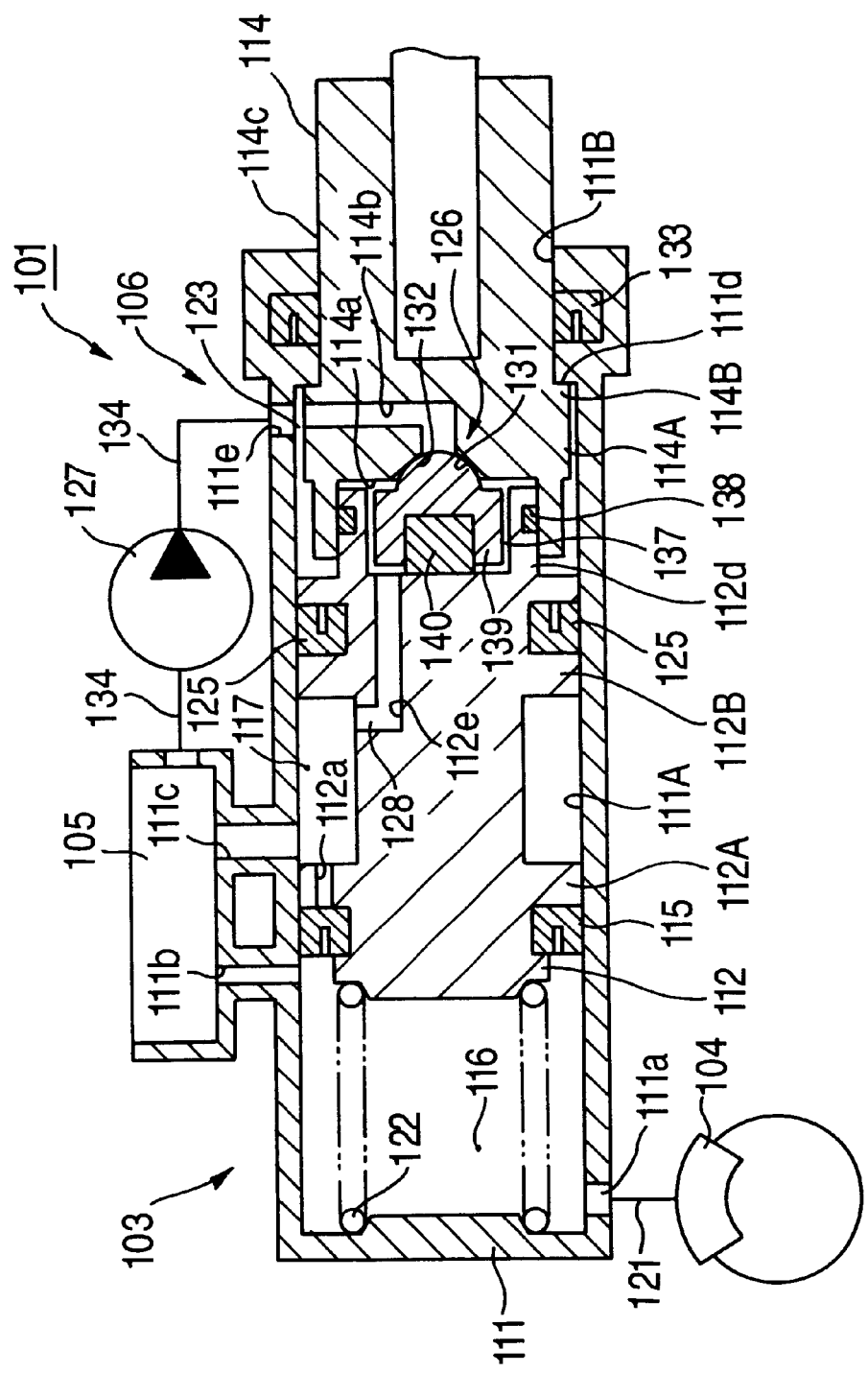
FIG. 2 is a cross section of a second embodiment of the invention.

FIG. 2 shows a second embodiment of the invention. In the second embodiment, the thrust piston (13) of the first embodiment is eliminated, a second cup seal 125 is disposed around a primary piston 112, and a valve chamber 137 is disposed between the rear side of the primary piston 112 and the front side of an input shaft 114 and contains a control valve 126 therein.

Specifically, the primary piston 112 of the second embodiment includes a first flange 112A around the outer periphery thereof toward the front end thereof, and a second flange 112B around its outer periphery toward the rear end thereof. A first annular passage 117 is formed between the both flanges 112A, 112B, and normally communicates with a reservoir 105 through a radial passage 111c formed in a housing 111.

In the similar manner as in the first embodiment, a first cup seal 115 is mounted around the front portion of the first flange 112A, which is formed with an axial opening 112a. Accordingly, a flow of braking liquid from the first annular passage 117 into a liquid pressure chamber 116 through the outside of the first cup seal 115 is permitted while blocking a flow of the braking liquid in the opposite direction.

In the second embodiment, an internal space within a bore 111A of an increased diameter which is located rearward of the second flange 112B defines an intensifying chamber 123. An annular, second cup seal 125 which is C-shaped in section is mounted around the outer periphery of the second flange 112B, whereby a flow of braking liquid from the first annular passage 117 into the intensifying chamber 123 through the outside of the second cup seal 125 is permitted while blocking a flow of the braking liquid in the opposite direction.

The primary piston 112 has a tubular member 112d mounted on its rear end face in a projecting manner therefrom, while a bottomed opening 114a of an increased diameter is formed in the front end face of an input shaft 114 so that the tubular member 112d of the primary piston 112 is slidably fitted into the bottomed opening 114a in the input shaft 114. An annular seal member 138 is mounted in surrounding relationship with the tubular member 112d of the primary piston 112, thereby maintaining a liquid tightness between the tubular member 112d of the primary piston 112 and the peripheral surface which defines the bottomed opening 114a in the input shaft 114. A valve chamber 137 is defined by an internal space within the tubular member 112d of the primary piston 112 and an internal space of the bottomed opening 114a in the input shaft 114.

A communication path 112e is formed in the primary piston 112 and has a front end which communicates with the first annular passage 117 and a rear end which faces the valve chamber 137. A communication is normally established between the reservoir 105 and the valve chamber 137 through the communication path 112e, the first annular passage 117 and a radial passage 111c.

The input shaft 114 is formed with a communication path 114b which opens centrally into the bottom of the bottomed opening 114a at its one end and opens into the outer peripheral surface of a portion 114A of an increased diameter at its other end to communicate with the intensifying chamber 123, thereby allowing a communication between the valve chamber 137 and the intensifying chamber 123 through the communication path 114b. The end of the communication path 114b which opens into the bottomed opening 114a has a conical configuration, which serves as a valve seat 131.

On the other hand, a valve member 139 is disposed in the valve chamber 137 and has a rear shank portion which bulges in a semi-spherical configuration to serve as a valve element 132. A resilient member 140 in the form of a solid cylinder is fitted, from the front side, into the valve member 139. The front end of the resilient member 140 projects forwardly beyond the valve member 139 and abuts a shank portion at the end face of the primary piston 112. In this manner, the valve member 139 (or valve element 132) engages the primary piston 112 through the interposed resilient member 140.

A clearance is normally maintained between the inner peripheral surface of the tubular member 112d of the primary piston 112 and the outer periphery of the valve member 139, and the valve element 132 projects rearward beyond the tubular member 112d of the primary piston 112 for engagement with or disengagement from the valve seat 131. In this manner, the valve element 132 and the valve seat 131 constitute together a control valve 126 in the present embodiment.

The primary piston 112 and the valve element 132 are normally urged rearward by a spring 122 disposed in the liquid pressure chamber 116. Accordingly, in the inoperative condition shown where the input shaft 114 and the primary piston 112 are retracted to their rearmost positions, the valve element 132 is seated upon the valve seat 131 to close the control valve 126, whereby a communication between the valve chamber 137 and the intensifying chamber 123 is interrupted.

By contrast, when the valve element 132 is removed from the valve seat 131 to open the control valve 126, a communication is established between the intensifying chamber 123 and the valve chamber 137 through the communication path 114b, and thus a communication is established between the intensifying chamber 123 and the reservoir 105 through the communication path 114b, the valve chamber 137, the communication path 112e, the first annular passage 117 and the radial passage 111c. Thus, in the second embodiment, the communication path 114B, the valve chamber 137, the communication path 112e, the first annular passage 117 and the radial passage 111c constitute together a discharge passage 128 through which the braking liquid in the intensifying chamber 123 is discharged into the reservoir 105.

As before, in the present embodiment, an end face 114B of the portion 114A of an increased diameter of the input shaft 114 is disposed in abutment against a stepped end face 111d of the housing 111 to define the inoperative positions of the input shaft 114 and the primary piston 112 under the inoperative condition.

In the present embodiment, a portion 114C of a reduced diameter of the input shaft 114 has a diameter which is greater than the external diameter of the tubular member 112d of the primary piston 112. An annular seat area where the valve element 132 and the valve seat 131 are mutually in contact with each other has a diameter which is less than the internal diameter of the tubular member 112d.

In other respects, the arrangement is similar to the first embodiment, and accordingly, parts corresponding to those shown in the first embodiment are designated by like numerals as used before, to which 100 is added. It is to be noted that a brake pedal is omitted from illustration in the second embodiment.

Description of Operation

With the described arrangement, under the inoperative condition shown, a pump 127 is not in operation, and the control valve 126 is closed. If a brake pedal is gently depressed under this condition, the input shaft 114 and the primary piston 112 are driven forward while maintaining the control valve 126 closed, and accordingly a master cylinder pressure is generated in the liquid pressure chamber 116, allowing a braking force to be obtained in a normal manner.

As the input shaft 114 is driven forward, the volume of the intensifying chamber 123 increases, but the intensifying chamber 123 cannot assume a negative pressure because the braking liquid is supplemented from the first annular passage 117 into the intensifying chamber 123 through the outside of the second cup seal 125. When the brake pedal is released subsequent to the actuation, the input shaft 114 initially retracts to return to its inoperative position shown. Subsequently, as the input shaft 114 retracts to remove the valve element 132 away from the valve seat 131 to open the control valve 126, the braking liquid is discharged from the intensifying chamber 123 to the reservoir 105 through the discharge passage 128. Accordingly, the primary piston 112 and the valve element 132 also return to their inoperative positions shown, and the valve element 132 is seated upon the valve seat 131 to close the control valve 126.

In contrast to the normal braking operation mentioned above, when intensifying means 106 is activated, if a brake pedal is rapidly depressed as described above in connection with the first embodiment in order to afford a brake assistance, this is detected by detecting means, not shown, whereby a controller operates the pump 127. Accordingly, a discharge pressure from the pump 127 is introduced into the intensifying chamber 123, generating a liquid pressure therein. The liquid pressure in the intensifying chamber 123 drives the primary piston 112 forward, generating a master cylinder pressure which is greater than a corresponding pressure generated during the normal operation. The liquid pressure generated in the intensifying chamber 123 acts upon the valve element 132 through the communication path 114b. A reaction upon the input shaft 114 results from the liquid pressure in the liquid pressure chamber 116 and has an amount corresponding to the cross-sectional area of the portion 114C of a reduced diameter of the input shaft 114 which is located outside of the external diameter of the tubular member 112d of the primary piston.

In response thereto, the input shaft 114 is pushed back relative to the primary piston 112, whereby the valve element 132 is removed from the valve seat 131 to open the control valve 126. The opening of the control valve 126 (or the separation between the valve element 132 and the valve seat 131) is reduced in response to the input from the input shaft 114, and accordingly the liquid pressure in the liquid pressure chamber 116 rises to increase the master cylinder pressure. In this manner, the liquid pressure is generated in the intensifying chamber 123 in accordance with the input from the input shaft 114.

The second embodiment thus constructed achieves similar functioning and advantages as achieved by the first embodiment. In the second embodiment, the provision of the resilient member 140 on the valve member 139 prevents any significant force from acting between the valve element 132 and the valve seat 131 to improve the durability of the valve element 132 and the valve seat 131 since the resilient member 140 becomes deformed as the input from the input shaft 114 is applied to allow the free end of the portion 114A of an increased diameter of the input shaft 114 to abut against the second flange 112B of the primary piston 112, thus urging the primary piston 112 directly with the input shaft 114.

Also in the second embodiment, when the brake pedal is depressed to drive the input shaft 114 forward, the controller may be used to activate the intensifying means 106 (pump 127), allowing the intensifying means 106 to function substantially as a liquid pressure booster.

It will be noted that the primary piston 112 of the second embodiment may be axially split at a median point between the both flanges 112A and 112B, with a rear portion being constructed as a thrust piston.

Third Embodiment

Figure 3:
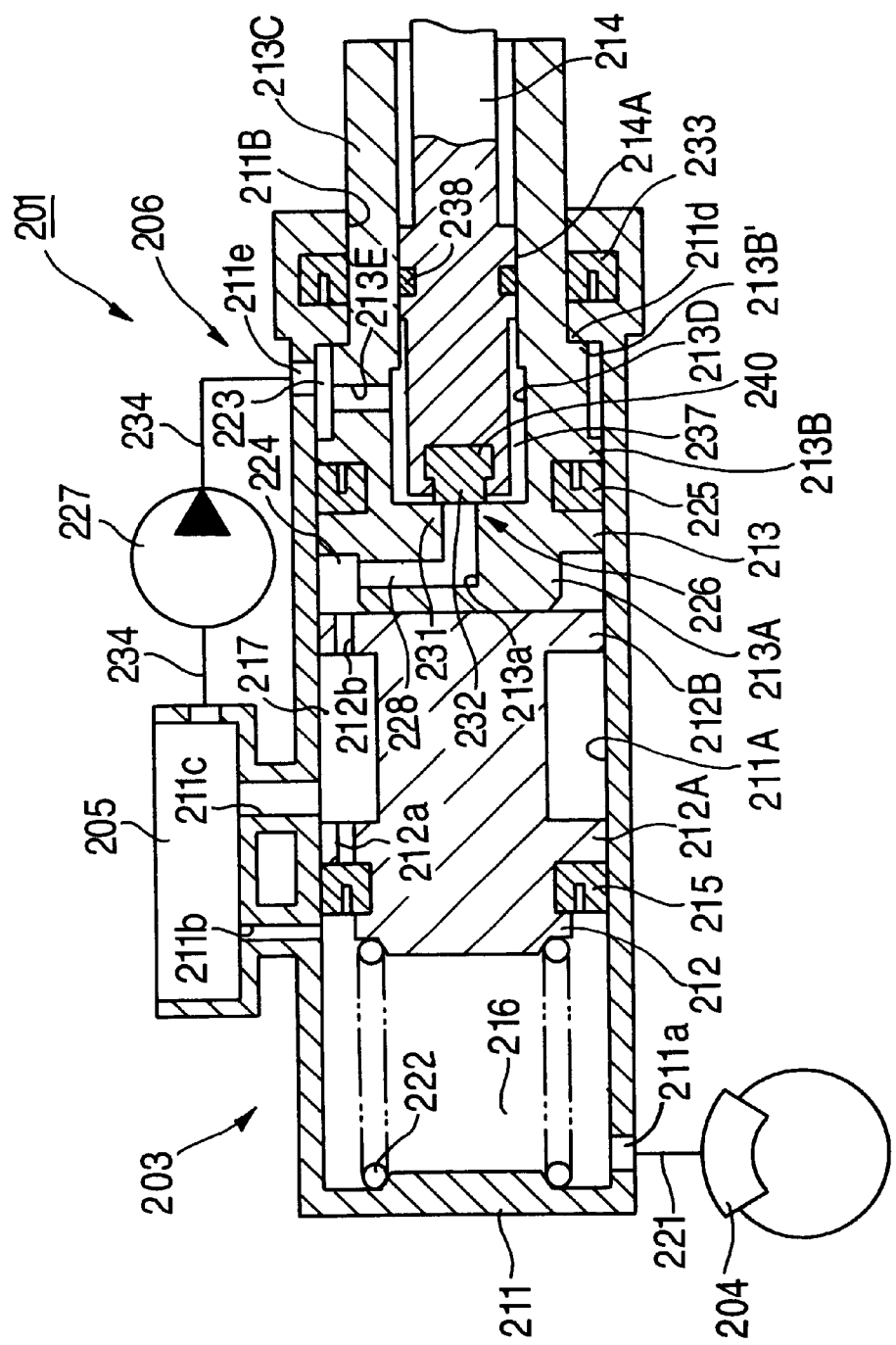
FIG. 3 is a cross section of a third embodiment of the invention.

FIG. 3 shows a third embodiment of the invention. In the third embodiment, a rear portion of the thrust piston (13) of the first embodiment shown in FIG. 1 is made tubular to receive an input shaft 214 in a slidable manner while containing a control valve 226 inside the thrust piston 213.

Specifically, the thrust piston 213 of the third embodiment comprises a section 213B of an increased diameter followed rearwardly by a section 213B' of an intermediate diameter and a section 213C of a reduced diameter. An intensifying chamber 223 is formed between the section 213B' of an intermediate diameter and a bore 211A of an increased diameter formed in a housing 211. The section 213C of a reduced diameter slidably extends through a bore 211B of a reduced diameter of the housing to the outside thereof. A seal member 233 is disposed in the bore 211B of the reduced diameter to maintain a liquid tightness between the outer peripheral surface of the section 213C of a reduced diameter and the bore 211B of a reduced diameter.

The section 213C of the reduced diameter is formed with a bottomed opening 213D in alignment with the axis thereof and extending from the rear end face thereof to a position which is located radially inward of a second cup seal 225. An input shaft 214 has a portion 214A of an increased diameter which is slidably fitted into the bottomed opening 213D. A seal member 238 is mounted around the portion 214A of an increased diameter to maintain a liquid tightness between the portion 214A of an increased diameter and a peripheral surface of the bottomed opening 213D. A valve chamber 237 is defined by an internal space within the bottomed opening 213D at a location adjacent to and forwardly of the portion 214A of an increased diameter, and normally communicates with the intensifying chamber 223 through a radial communication path 213E formed in the thrust piston 213.

Toward the front end, the thrust piston 213 is formed with a communication path 213a having a front end which opens into the outer peripheral surface of the section 213A of a reduced diameter to communicate with a second annular passage 224 and a rear end which opens centrally into the bottom of the bottomed opening 213D, thus permitting a communication between the valve chamber 237 and the second annular passage 224. In the third embodiment, the rear end of the communication path 213a forms a valve seat 231.

A resilient member 240 in the form of a solid cylinder is embedded into a front end face of the input shaft 214 which opposes the valve seat 231, and the end face of the resilient member 240 which projects beyond the front end face of the input shaft 214 defines a valve element 232. By moving the valve element 232 for engagement with or disengagement from the valve seat 231, a communication between the valve chamber 237 and the second annular passage 224 can be switched. In this manner, in the present embodiment, the valve element 232 and the valve seat 231 constitute together a control valve 226.

The primary piston 212 and the thrust piston 213 are normally urged rearward by a spring 222 which is disposed in a liquid pressure chamber 216. Accordingly, under the inoperative condition shown where the input shaft 214 and the primary piston 212 retract to their rearmost positions, the valve element 232 is seated upon the valve seat 231 to close the communication path 213a of the thrust piston 213, thereby interrupting a communication between the valve chamber 237 and the second annular passage 224. Under this inoperative condition, the section 213B' of an intermediate diameter of the thrust piston 213 abuts against a stepped end face 211d of the housing 211 to define the retraced ends within the housing 211 of the thrust piston 213 and the primary piston 212.

By contrast, when the valve element 232 is removed from the valve seat 231, a communication is established between the valve chamber 237 and the second annular passage 224 through the communication path 213a, thus establishing a communication between the intensifying chamber 223 and a reservoir 205 through the communication path 213E, the valve chamber 237, the communication path 213a, the second annular passage 224, an axial opening 212b, a first annular passage 217 and a radial passage 211c. Thus, in the present embodiment, the communication path 231E, the valve chamber 237, the communication path 213a, the second annular passage 224, the axial opening 212b, the first annular passage 217 and the radial passage 211c form together a discharge passage 228 through which the braking liquid is discharged from the intensifying chamber 223 into the reservoir 205.

In other respects, the arrangement is similar to that of the first embodiment mentioned above, and corresponding parts are designated by like numerals as used before, to which 200 is added.

Description of Operation With the described arrangement, under the inoperative condition shown, a pump 227 is not in operation, and the control valve 226 is closed. If a brake pedal is gently depressed under this condition, the input shaft 214, the thrust piston 213 and the primary piston 212 are driven forward while maintaining the control valve 226 closed, thus generating a master cylinder pressure in the liquid pressure chamber 216 to develop a braking force in a normal manner. Although the volume of the intensifying chamber 223 increases as the input shaft 214 is driven forward, the intensifying chamber 223 cannot assume a negative pressure because the braking liquid from the second annular passage 214 is supplemented into the intensifying chamber 223 through the outside of the second cup seal 225.

When the brake pedal is released after the actuation, the input shaft 214 initially retracts to return to its inoperative position shown. As the input shaft 214 retracts, the valve element 232 is removed from the valve seat 231 to open the control valve 226, thus discharging the braking liquid from the intensifying chamber 223 into the reservoir 205 through the discharge passage 228. Accordingly, the thrust piston 213 and the primary piston 212 return to their inoperative positions shown under the influence of the master cylinder pressure in the liquid pressure chamber 216 and the resilience of the spring 222, and the valve element 232 is seated upon the valve seat 231 to close the control valve 226.

In contrast to the normal brake operation mentioned above, when the intensifying means 206 is activated, if a brake pedal is rapidly depressed in order to provide a brake assistance in the similar manner as in the first embodiment, detecting means, not shown, detects this, and the controller activates or operates the pump 227. Accordingly, the discharge pressure from the pump 227 is introduced into the intensifying chamber 223, generating a liquid pressure in the intensifying chamber 223. The liquid pressure in the intensifying chamber 223 drives the primary piston 212 forward, generating a master cylinder pressure in the liquid pressure chamber 216 which is greater than during the normal operation. As before, the control valve 226 is effective to generate a liquid pressure in the intensifying chamber 223 in accordance with an input from the input shaft 214, thus intensifying the master cylinder pressure in accordance with such liquid pressure.

Subsequently, when the brake pedal is released and the input shaft 214 retracts, the thrust piston 213 and the primary piston 212 also retract to their inoperative positions shown, in the similar manner as during the normal operation.

The third embodiment thus constructed can achieve similar functioning and advantages as achieved by the first embodiment. In the third embodiment, the resilient member 240 is provided on the front end of the input shaft 214 to serve as the valve element 232, and this improves the liquid tightness of the control valve 226. During the normal braking operation, as an input is applied to the input shaft 214, the resilient member 240 is deformed to cause the input shaft 214 to push the thrust piston 213 directly, thus preventing any significant force from acting upon the control valve 226 and thus improving the durability of the control valve 226.

Fourth Embodiment

Figure 4:
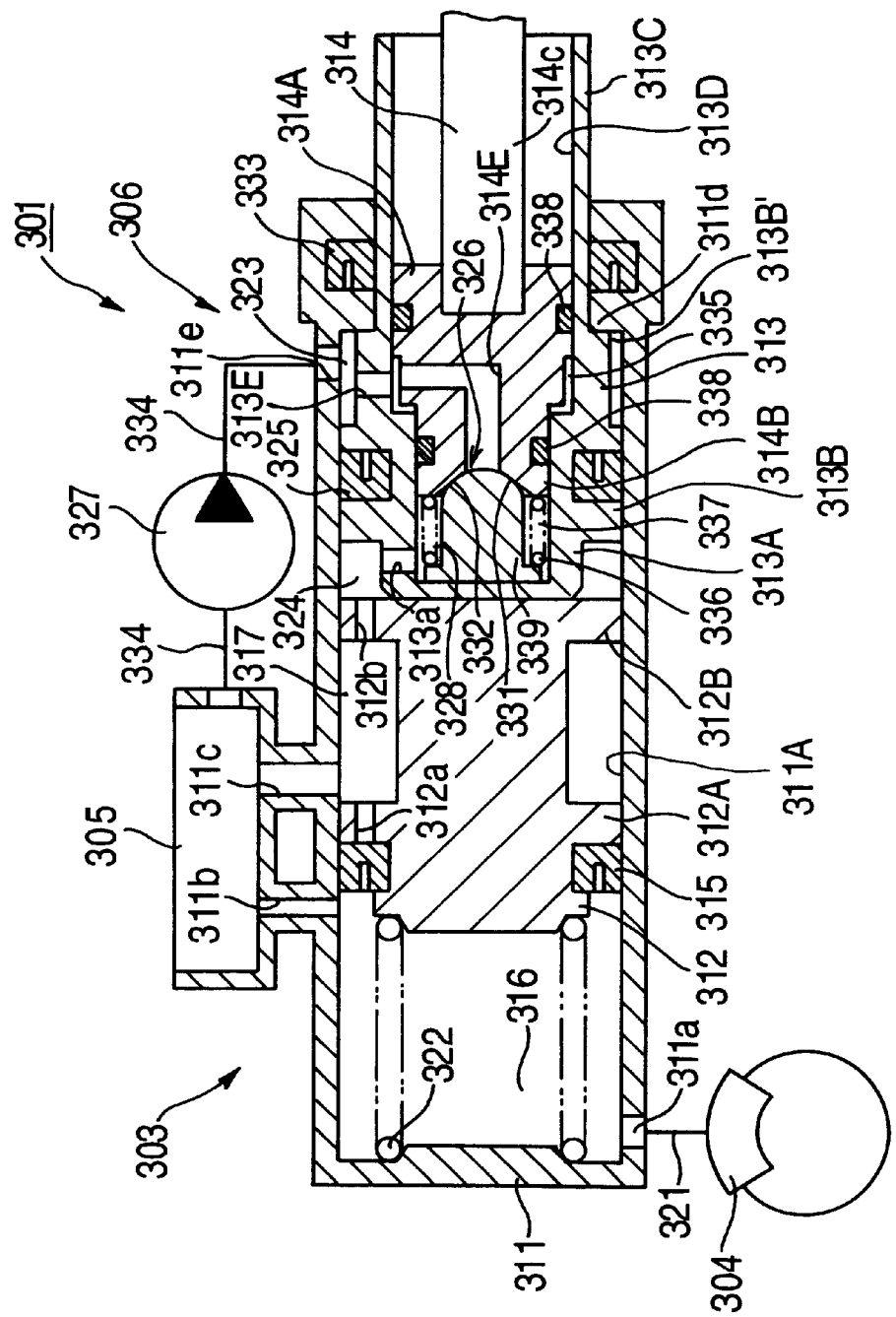
FIG. 4 is a cross section of a fourth embodiment of the invention.

FIG. 4 shows a fourth embodiment of the invention. In the fourth embodiment, the internal construction of the thrust piston 213 of the third embodiment shown in FIG. 3 is improved.

Specifically, in the fourth embodiment, a thrust piston 313 has a bottomed opening 313D which has a reduced diameter toward the front end and a greater diameter toward the rear end, thus extending into a section of a reduced diameter of the thrust piston 313 which is located toward the front end thereof.

On the other hand, an input shaft 314 has a front section 314B of an intermediate diameter which is sequentially followed by a section 314A of an increased diameter and then by a section 314C of a reduced diameter. The section 314B of an intermediate diameter is slidably fitted into a small diameter portion of the bottomed opening 313D while the section 314A of an increased diameter is slidably fitted into a large diameter portion of the bottomed opening 313D. Annular seal members 338 are mounted around the outer periphery of the sections of an intermediate diameter and an increased diameter 314B, 314A to maintain a liquid tightness between the sections 314B and 314A and the bottomed opening 313D.

The section 314A of an increased diameter has a step at its front end, which defines an annular recess which is continuous in the circumferential direction, and an annular passage 335 is formed in surrounding relationship with the annular recess and the section 314B of an intermediate diameter which is located adjacent thereto. The annular passage 335 normally communicates with an intensifying chamber 323 through a communication path 313E formed in the thrust piston 313.

In the fourth embodiment, a space between the bottom of the bottomed opening 313D and an opposing front end face of the input shaft 314 defines a valve chamber 337. The section 313A of a reduced diameter of the thrust piston 313 is formed with a radial communication path 313a which normally communicates the valve chamber 337 with a second annular passage 324. The input shaft 314 is formed with a communication path 314E which opens into the front end face at its one end, and opens into the annular recess at its other end to communicate with the second annular passage 324, the end of the communication path 314E which opens into the front end face defining a conical valve seat 331.

The valve chamber 337 contains a valve member 339 having a front flange, and a spring 336 is disposed between the flange and the opposing front end face of the input shaft 314. The spring 336 has a resilience which is less than that of a spring 322 disposed within a liquid pressure chamber 316. The spring 336 urges the front end face of the valve member 339 normally into abutment against the bottom of the bottomed opening 313D. The valve member 339 has a rear end which is semi-spherical, and which defines a valve element 332 adapted for movement into engagement with or disengagement from the valve seat 331.

In the present embodiment, the valve seat 331 and the valve element 332 constitute together a control valve 326 which switches a communication between a reservoir 305 and the intensifying chamber 323.

Because the spring 322 disposed in the liquid pressure chamber 316 normally urges a primary piston 312 and the thrust piston 313 rearward, the valve element 332 is seated upon the valve seat 331 in the inoperative condition shown. In this inoperative condition, a communication between the valve chamber 337 and the intensifying chamber 323 is interrupted.

By contrast, when the input shaft 314 retracts rearward with respect to the thrust piston 313, the valve element 332 is removed from the valve seat 331, whereby a communication is established between the intensifying chamber 323 and the valve chamber 337 through the communication path 313E, the annular passage 335 and the communication path 314E. Accordingly, a communication is established between the intensifying chamber 323 and the reservoir 305 through the communication path 313E, the annular passage 335, the communication path 314E, the valve chamber 337, the communication path 313a, the second annular passage 324, an axial opening 312b, the first annular passage 317 and a radial path 311c, allowing the braking liquid in the intensifying chamber 323 to be discharged into the reservoir 305. In this manner, in the fourth embodiment, the communication path 313E, the annular passage 335, the communication path 314E, the valve chamber 337, the communication path 313a, the second annular passage 324, the axial opening 312b, the first annular passage 317 and the radial path 311c define a discharge passage 328.

In other respects, the arrangement is similar to the arrangement of the third embodiment shown in FIG. 3, and accordingly, corresponding parts are designated by like numerals as used before, to which 100 is added.

Description of Operation

With the described arrangement, in the inoperative condition shown, a pump 327 is not in operation and the control valve 326 is closed. If a brake pedal is now gently depressed, the input shaft 314, the thrust piston 313 and the primary piston 312 are driven forward while maintaining the control valve 326 closed, thus generating a master cylinder pressure in the liquid pressure chamber 316 to develop the braking force in a normal manner. Though the volume of the intensifying chamber 323 increases as the input shaft 314 is driven forward, the intensifying chamber cannot assume a negative pressure since the liquid pressure is replenished to the intensifying chamber 323 through the outside of a second cup seal 325.

If the brake pedal is released after the actuation, the input shaft 314 initially retracts to return to its inoperative positions shown. Subsequently, the valve element 332 is removed the valve seat 331 to open the control valve 326 as the input shaft 314 retracts, whereby the braking liquid in the intensifying chamber 323 is discharged into the reservoir 305 through the discharge passage 328. Accordingly, the thrust piston 313 and the primary piston 312 return to their inoperative positions shown under the influence of the master cylinder pressure in the liquid pressure chamber 316 and the resilience of the spring 322, thus closing the control valve 326.

In contrast to the normal braking operation mentioned above, when intensifying means 306 is activated as by rapidly depressing a brake pedal to obtain a brake assistance as described above in connection with the first embodiment, detecting means, not shown, detects this, and a controller, not shown, operates the pump 327. Accordingly, a discharge pressure from the pump 327 is introduced into the intensifying chamber 323, generating a liquid pressure therein. The liquid pressure in the intensifying chamber 323 drives the primary piston 312 forward, thereby generating a master cylinder pressure in the liquid pressure chamber 316 which is higher than during a normal braking operation. Also in this embodiment, the control valve 326 causes a liquid pressure which corresponds to an input from an input shaft 314 to be generated in the intensifying chamber 323, the liquid pressure acting to intensify the master cylinder pressure.

Subsequently, when the brake pedal is released and the input shaft 314 retracts, the thrust piston 313 and the primary piston 312 also retract to return to their inoperative positions shown, in the similar manner as occurs during a normal operation.

The fourth embodiment constructed in the manner mentioned above achieves a similar functioning and advantages as achieved by the first embodiment. In the fourth embodiment, there is provided the spring 336 which urges the valve member 339 away from the valve seat 331, and accordingly, when the brake pedal is released after the actuation, the spring 336 is effective to remove the valve element 332 from the valve seat 331 positively as the input shaft 314 retracts, assuring a smooth return of the primary piston 312 and the thrust piston 313 to their inoperative positions.

Fifth Embodiment

Figure 5:
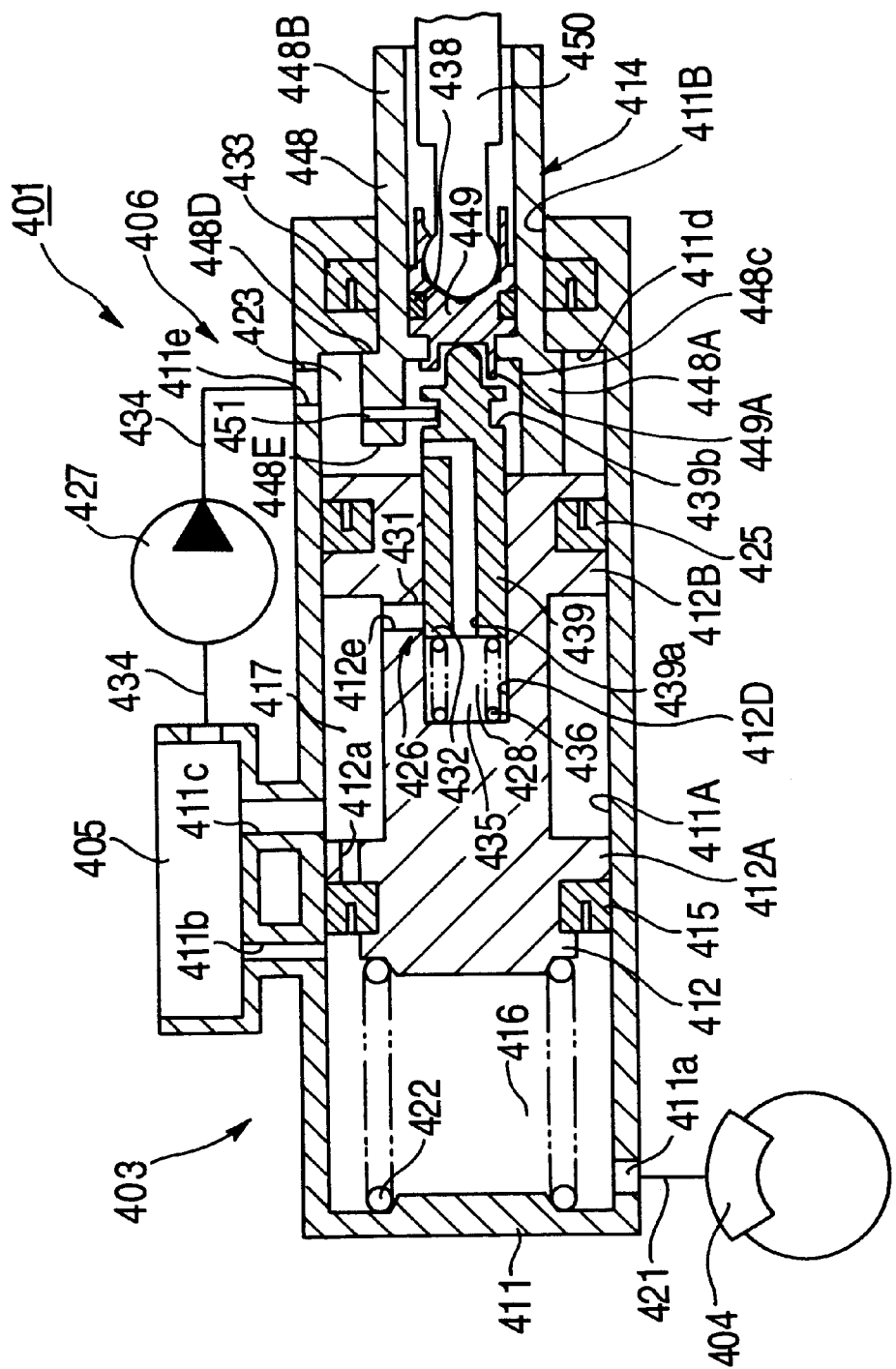
FIG. 5 is a cross section of a fifth embodiment of the invention.

FIG. 5 shows a fifth embodiment of the invention. In the fifth embodiment, the thrust piston (13) of the first embodiment is eliminated, a second cup seal 425 is mounted on a primary piston 412, and a spool valve 439 is used to act as a valve element 432.

Specifically, the outer periphery of the primary piston 412 is provided with a first flange 412A toward the front end and a second flange 412B toward the rear end. A first annular passage 417 is formed between the both flanges 412A, 412B and communicates with a reservoir 405 through a radial passage 411c formed in a housing 411.

A first cup seal 415 is mounted on the front side of the first flange 412A, which is formed with an axial opening 412a.

Accordingly, a flow of braking liquid from the first annular passage 417 into a liquid pressure chamber 416 is permitted through the outside of the first cup seal 415 while a flow of the braking liquid in the opposite direction is blocked.

In the fifth embodiment, an internal space in a bore 411A of an increased diameter which is located rearward of the rear end face of the primary piston 412 defines an intensifying chamber 423. An annular second cup seal 425 which is C-shaped in section is mounted around the outer periphery of the second flange 412B, whereby a flow of the braking liquid from the first annular passage 417 into the intensifying chamber 423 is permitted through the outside of the second cup seal 425 while a flow of the braking liquid in the opposite direction is blocked.

A bottomed opening 412D is formed in the rear end face of the primary piston 412 in alignment with the axis thereof, and a spool valve 439 is slidably fitted into the bottomed opening 412D from the rear side. A space formed between the bottom of the bottomed opening 412D and the opposing front end face of the spool valve 439 defines a spring chamber 435, in which a spring 436 is disposed to urge the spool valve 439 rearward normally.

The outer periphery of the spool valve 439 at its rear end normally projects into the intensifying chamber 423, and has a rear end which is semi-spherical disposed in abutment against an input shaft 414. The spool valve 439 is internally formed with a communication path 439a having a rear end which communicates with the intensifying chamber 423 and a front end which communicates with the spring chamber 435.

The primary piston 412 is formed with a radial communication path 412e, which permits a communication between the bottomed opening 412D and the first annular passage 417. In the present embodiment, the inner end of the communication path 412e which opens into the peripheral surface of the bottomed opening 412D defines a valve seat 431 while a front end (outer peripheral edge) of the spool valve 439 defines a valve element 432. The valve seat 431 and the valve element 432 constitute together a control valve 426.

In the inoperative condition shown, the inner opening of the communication path 412e is completely closed by the outer periphery of the spool valve 439 toward the front end thereof, thus interrupting a communication between the spring chamber 435 and the first annular passage 417. By contrast, when the spool valve 439 is moved rearward within the bottomed opening 413D to allow the valve element 432 to overlap the inner opening (valve seat 431) of the communication path 412e, a communication is established between the spring chamber 435 and the first annular passage 417. In other words, at this time, a communication between the reservoir 405 and the intensifying chamber 423 is established through the communication path 439a, the spring chamber 435, the communication path 412e, the first annular passage 417 and a passage 411c. Accordingly, when the input shaft 414 is driven forward under the inoperative condition shown and a discharge pressure from a pump 427 is fed into the intensifying chamber 423 to generate a liquid pressure in the intensifying chamber 423, the front end of the spool valve 439 (valve element 432) throttles the opening of the communication path 412e to generate a liquid pressure in the intensifying chamber 423 in accordance with the magnitude of an input from the input shaft 414. The liquid pressure in the intensifying chamber 423 drives the primary piston 412 forward, generating a master cylinder pressure.

In the fifth embodiment, the input shaft 414 comprises a tubular member 448, a solid cylindrical member 449 and a rod member 450, the tubular member 448 including a front portion 448A of an increased diameter. A portion of the tubular member 448 which is located rearward of the portion 448A of an increased diameter is defined as a portion 448B of a reduced diameter. The portion 448A of an increased diameter is disposed in the intensifying chamber 423 while the portion 448B of a reduced diameter sidably extends through a bore 411B of a reduced diameter of a housing 411 to project externally. A seal member 433 is mounted around the portion 448B of a reduced diameter to maintain a liquid tightness between the portion 448B of a reduced diameter and the bore 411B of a reduced diameter of the housing 411.

Toward the front end, the inner periphery of the tubular member 448 is formed with an annular projection 448C, and the solid cylindrical member 439 is fitted into the annular projection 448C and into the inner periphery of the tubular member 448 which is located adjacent to and rearward of the annular projection 448C. A seal member 438 is fitted into the outer periphery of the solid cylindrical member 449 to maintain a liquid tightness between the outer periphery of the solid cylindrical member 449 and the inner periphery of the tubular member 448.

The front end of the rod member 450 is inserted into the tubular member 448 from the rear side to be pivotally connected to a rear shank portion of the solid cylindrical member 449. The rear end of the rod member 450 is connected to a brake pedal, not shown.

At its front end, the solid cylindrical member 449 is formed with a tubular portion 449A of a reduced diameter, and after the tubular portion 449A has moved past the annular projection 448C, the front extremity of the tubular portion 449A is partly folded radially outward to be detained to the annular projection 448C. In this manner, the solid cylindrical member 449 is integrally connected to the tubular member 448 in the axial direction while allowing the solid cylindrical member 449 to rotate circumferentially relative to the tubular member 448.

The rear end of the spool valve 439 is inserted into the tubular member 448 from the front side to be disposed in abutment against the front end of the solid cylindrical member 449 in its axial region.

Toward the rear end, the outer periphery of the spool valve 439 is formed with an annular groove 439b, into which the inner end of a locking pin 451 secured to the tubular member 448 is inserted from the radial outside. In this manner, a withdrawal of the rear end of the spool valve 439 from the input shaft 414 is prevented while allowing a slight axial relative movement between the spool valve 439 and the input shaft 414 by an amount by which the locking pin 451 is allowed to move axially within the annular groove 439b.

In the inoperative condition shown, the input shaft 414 is located at its retracted position where a stepped end face 448D of the tubular member 448 abuts against a stepped end face 411d of the bore 411 of an increased diameter. Accordingly, the rear end face of the primary piston 412 is disposed in abutment against the front end face of the input shaft 414 (tubular member 448). The front end of the tubular member 448 is formed with a radial notch 448E, allowing a communication between the intensifying chamber 423 and the communication path 439a in the spool valve to allow the braking liquid to be introduced into the front end of the tubular member 448.

In the fifth embodiment, the communication path 439a in the spool valve 439, the spring chamber 435, the communication path 412e, the first annular passage 417 and the path 411c form together a discharge passage 428 through which a communication is established between the intensifying chamber 423 and the reservoir 405. By throttling the opening of the communication path 412e (opening of valve seat 431) by means of the valve element 432 mounted on the spool valve 439, a liquid pressure is generated in the intensifying chamber 423 in accordance with an input.

In other respects, the arrangement is similar to that of the first embodiment shown in FIG. 1, and the corresponding parts are designated by like numerals as used before, to which 300 is added.

Description of Operation

With the described arrangement, in the inoperative condition shown, the pump 427 is not in operation, and the outer periphery of the spool valve 439 toward the front end thereof closes the communication path 412e to close the control valve 426.

If the brake pedal is gently depressed under this condition, the input shaft 414, the primary piston 412 and the spool valve 439 are driven forward while maintaining the control valve 426 closed, thus generating a master cylinder pressure in the liquid pressure chamber 416 to obtain a braking force in a normal manner. Though the volume of the intensifying chamber 423 increases as the input shaft 414 and primary piston 412 are driven forward, the intensifying chamber 423 cannot assume a negative pressure because the braking liquid is replenished into the intensifying chamber 423 through the outside of the second cup seal 425.

If the brake pedal is released after the actuation, the input shaft 414 retracts initially, followed by a retracting movement of the spool valve 439 which is coupled thereto by the locking pin 451, both returning to their inoperative positions shown. As the input shaft 414 and the spool valve 439 retract in this manner, the opening of the communication path 412e overlaps the valve element 432 (the front end of the spool valve 439) to open the control valve 426, whereby the braking liquid is discharged from the intensifying chamber 423 into the reservoir 405 through the discharge passage 428. Accordingly, the primary piston 412 returns to its inoperative position shown under the influence of the master cylinder pressure in the liquid pressure chamber 416 and the resilience of the spring 422, and the opening of the communication path 412e is closed by the outer periphery of the primary piston 412 to close the control valve 426.

In contrast to the normal braking operation described above, when intensifying means 406 is activated as by rapidly depressing the brake pedal to obtain a brake assistance as it occurs in the first embodiment, for example, detecting means, not shown, detects this, whereby a controller operates the pump 427. Then, a discharge pressure from the pump 427 is introduced into the intensifying chamber 423, generating a liquid pressure therein. The liquid pressure in the intensifying chamber 423 drives the primary piston 412 forward, generating a master cylinder pressure in the liquid pressure chamber 416.

The liquid pressure in the intensifying chamber 423 also acts upon the spring chamber 435 to push back the spool valve 439 and the input shaft 414, thus opening the control valve 426. The opening of the control valve 426 (or the degree of overlap between the opening of the communication path 412e and the valve element) is throttled in accordance with an input from the input shaft 414, thus generating a liquid pressure in the intensifying chamber 423 in accordance with the input, and this liquid pressure in turn is effective to generate a master cylinder pressure.

Subsequently, when the brake pedal is released and the input shaft 414 retracts, the spool valve 439 and the primary piston 412 also retract to their inoperative positions shown in the similar manner as during the normal operation.

The fifth embodiment constructed in the manner mentioned above achieves similar functioning and advantages as in the first embodiment.

In the fifth embodiment, the input shaft comprises the three members, in which the rod member 450 is pivotally connected to the solid cylindrical member 449. Accordingly, if the brake pedal rocks either fore-and-back or laterally with respect to the direction of depression, such rocking motion is allowed for without causing any trouble. Also, in the fifth embodiment, the spool valve 439 is provided as a valve element for the valve 426 and is engaged with the input shaft 414 through the pin 451, and this allows any undue force which might act upon the control valve 426 to be prevented while assuring a reliable operation of the spool valve 439 in accordance with the movement of the input shaft 414, thus allowing the primary piston 412 to return smoothly to its inoperative position during a returning motion.

Sixth Embodiment

Figure 6:
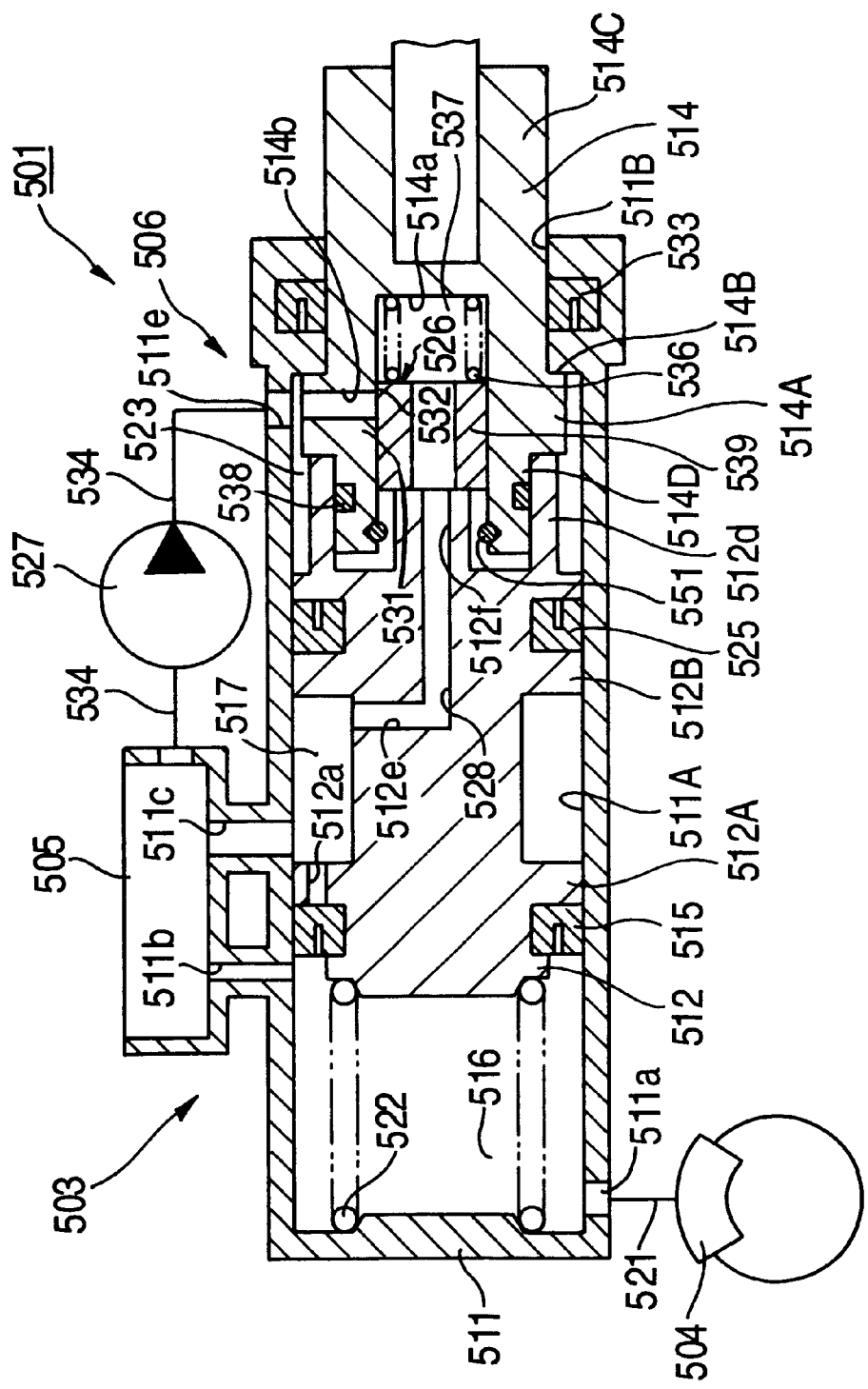
FIG. 6 is a cross section of a sixth embodiment of the invention.

FIG. 6 shows a sixth embodiment of the invention. The sixth embodiment is an improvement of the second embodiment shown in FIG. 2 where the outer periphery of an input shaft 514 toward its front end is slidably fitted into a tubular portion 512*d* of a primary piston 512 and a control valve 526 is contained within a bottomed opening 514*a* of the input shaft 514.

Specifically, the tubular portion 512*d* of the primary piston 512 has a greater diameter than shown in FIG. 2, and a front portion of the input shaft 514 is formed as a fitting portion 514D having an external diameter which is less than the diameter of the portion 514A of an increased diameter. The fitting portion 514D is slidably fitted into the tubular portion 512*d* of the primary piston 512, and a seal member 538 maintains a liquid tightness between the tubular portion 512*d* of the primary piston and the fitting portion 514D.

The portion 514A of an increased diameter of the input shaft 514 has a radial communication path 514*b* formed therein, which allows a communication between an intensifying chamber 523 and the interior of the bottomed opening 514*a*. The space within the bottomed opening 514*a* defines a valve chamber 537.

A spool valve 539 is slidably fitted in the valve chamber 537, and a spring 536 is disposed in the valve chamber 537 at a location rearward of the spool valve 539, thus normally urging the spool valve 539 forwardly.

On the other hand, a rearwardly extending solid cylinder 512*f* of a reduced diameter is formed centrally on the end face of the primary piston 512 at a location inside the tubular portion 512*d*, and is inserted into the bottomed opening 514*a* of the input shaft 514 from the front side to abut against the spool valve 539. The primary piston 512 is formed with a communication path 512*e* which communicates with a first annular passage 517 at its one end and opens into the rear end face of the solid cylinder 512*f* at its other end.

Under the inoperative condition shown, the rear end of the tubular portion 512*d* of the primary piston 512 abuts against a front, stepped end face of the portion 514A of an increased diameter of the input shaft 514, and the inner opening of the communication path 514*b* is closed by the outer periphery of the spool valve 539, toward the rear end thereof, which is abutted by the solid cylinder 512*f*. Thus, in the present embodiment, the inner opening of the communication path 514*b* serves as a valve seat 531 while the outer periphery of the spool valve 539 toward the rear end thereof serves as a valve element 532, and the valve seat 531 and the valve element 532 constitute together the control valve 526.

When the input shaft 514 is driven forward and a liquid pressure from a pump 527 is introduced into the intensifying chamber 523 to cause the primary piston 512 to be displaced forwardly relative to the input shaft 514, the spool valve 539 is moved forwardly relative to the input shaft 514. This allows the rear end of the spool valve 539 (valve element 532) to overlap the inner end of the communication path 514*b* (valve seat 531), allowing a communication between the intensifying chamber 523 and the valve chamber 537 through the communication path 514*b*. Thus, at this time, the communication path 514*b*, the valve chamber 537, the internal space of the spool valve 539, the communication path 512*e*, the first annular passage 517 and a path 511*c* constitute together a discharge passage 528, through which the braking liquid in the intensifying chamber 523 is discharged into a reservoir 505. In the present embodiment, the liquid pressure generated in the intensifying chamber 523 acts upon a fraction of the cross-sectional area of a portion 514C of a reduced diameter of the input shaft 514 lying outside the external diameter of the fitting portion 514D, and a reaction which results from the liquid pressure is balanced with the input applied to the input shaft 514, thus allowing the control valve 526 to generate a liquid pressure in the intensifying chamber 523 which is proportional to the input.

In other respects, the arrangement is similar to that of the second embodiment shown in FIG. 2, and corresponding parts are designated by like numerals as used before, to which 400 is added.

Description of Operation

With the described arrangement, in the inoperative condition shown, the pump 527 is not in operation and the opening of the communication path 512*e* (valve seat 531) is completely closed by the spool valve 539 to close the control valve 526.

If the brake pedal is gently depressed under this condition, the input shaft 514, the primary piston 512 and the spool valve 539 are driven forward while maintaining the control valve 526 closed, generating a master cylinder pressure in a liquid pressure chamber 516, obtaining a braking force in a normal manner. Though the volume of the intensifying chamber 523 increases as the input shaft 514 and the primary piston 512 are driven forward, it cannot assume a negative pressure because the braking liquid is replenished into the intensifying chamber 523 through the outside of the second cup seal 524.

If the brake pedal is released after the actuation, the input shaft 514 retracts initially. As the input shaft 514 retracts, the spool valve 539 assumes a forwardly advanced position within the valve chamber 537, and the valve element 532 of the spool valve 539 overlaps the opening of the communication path 512*e*. Accordingly, the braking liquid is discharged from the intensifying chamber 523 into the reservoir 505 through the discharge passage 528. Thus, the input shaft 514 and the primary piston 512 return to their inoperative positions shown, and the opening of the communication path 512*e* is closed by the spool valve 539 to close the control valve 526.

In contrast to the normal braking operation mentioned above, when intensifying means is activated as by rapidly depressing a brake pedal in order to obtain a brake assistance as described above in connection with the first embodiment, for example, detecting means, not shown, detects this and the controller operates the pump 527. Accordingly, a discharge pressure from the pump 527 is introduced into the intensifying chamber 523, generating a liquid pressure therein. The liquid pressure in the intensifying chamber 523 drives the primary piston 512 forward, generating a master cylinder pressure in the liquid pressure chamber 516.

As the primary piston 512 is driven forward by the liquid pressure in the intensifying chamber 523, the primary piston 512 is driven forwardly relative to the input shaft 514, whereby the degree of opening which the communication path 512e exhibits is throttled by the control valve 526. Thus, a liquid pressure is generated in the intensifying chamber 523 in accordance with the input from the input shaft 514, generating a corresponding master cylinder pressure.

Subsequently, when the brake pedal is released and the input shaft 514 retracts, the spool valve 539 and the primary piston 512 retract to return their inoperative positions shown in the similar manner as in the normal operation.

The sixth embodiment thus constructed can achieve similar functioning and advantages as achieved by the first embodiment. Since the spool valve 539 is provided to act as the valve element 532 for the control valve 526 in the sixth embodiment, there is no undue force acting upon the control valve 526, thus assuring a smooth operation thereof and also assuring a smooth operation and a return movement of the master cylinder 501.

FIGS. 7 to 12 show a seventh to a twelfth embodiment of the invention.

The first to the sixth embodiment shown in FIGS. 1 to 6 employ a normally closed control valve in that the control valve 26 (126, 226, 326, 426 or 526) closes the discharge passage 28 (128, 228, 328, 428 or 528) under the inoperative condition, but the seventh to the twelfth embodiment employ a normally open control valve in which the control valve is open in the inoperative condition of the first to the sixth embodiment.

Seventh Embodiment

Figure 7:
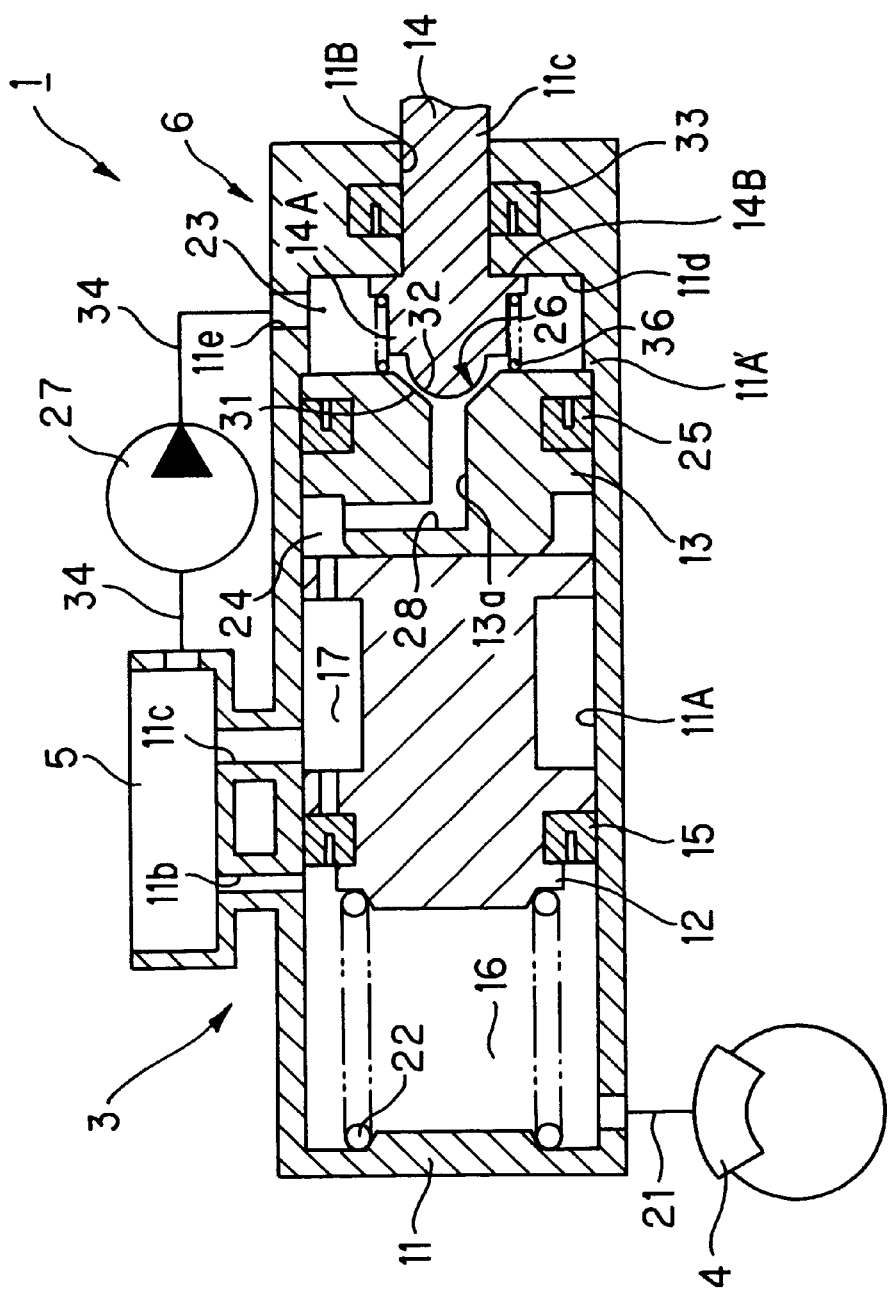
FIG. 7 is a cross section of a seventh embodiment of the invention.

Specifically, a seventh embodiment shown in FIG. 7 corresponds to the first embodiment shown in FIG. 1 except that an increased diameter bore 11A of a housing 11 is formed with a forwardly facing stepped surface 11A' toward the rear end thereof. In addition, a spring 36 is disposed between an increased diameter portion 14A of an input shaft 14 and a rear end face of a thrust piston 13 for normally urging the increased diameter portion 14A of the input shaft 14 and the rear end face of the thrust piston 13 away from each other. The spring 36 has a resilience which is less than the resilience of a spring 22 disposed in a liquid pressure chamber 16.

In the inoperative condition, the abutment of the rear end face of the thrust piston 13 against the stepped surface 11A' defines the retracted end positions of a primary piston 12 and the thrust piston 13 within the increased diameter bore 11A. Furthermore, the input shaft 14 has a stepped end face 14B which is disposed in abutment against a stepped end face 11d of the housing 11. In the inoperative condition, a valve element 32 is removed from a valve seat 31 to open a control valve 26, and accordingly, a communication is established between an intensifying chamber 23 and a reservoir 5 through a discharge passage 28.

In other respects, the arrangement is similar to that of the first embodiment shown in FIG. 1. In the seventh embodiment shown in FIG. 7, the control valve 26 is open in the inoperative condition, but as soon as the input shaft 14 is driven forward, the spring 36 is immediately compressed to close the control valve 26. A subsequent operation occurs in the similar manner as in the first embodiment shown in FIG. 1.

The seventh embodiment thus constructed can achieve similar functioning and advantages as achieved by the first embodiment.

Eighth Embodiment

Figure 8:
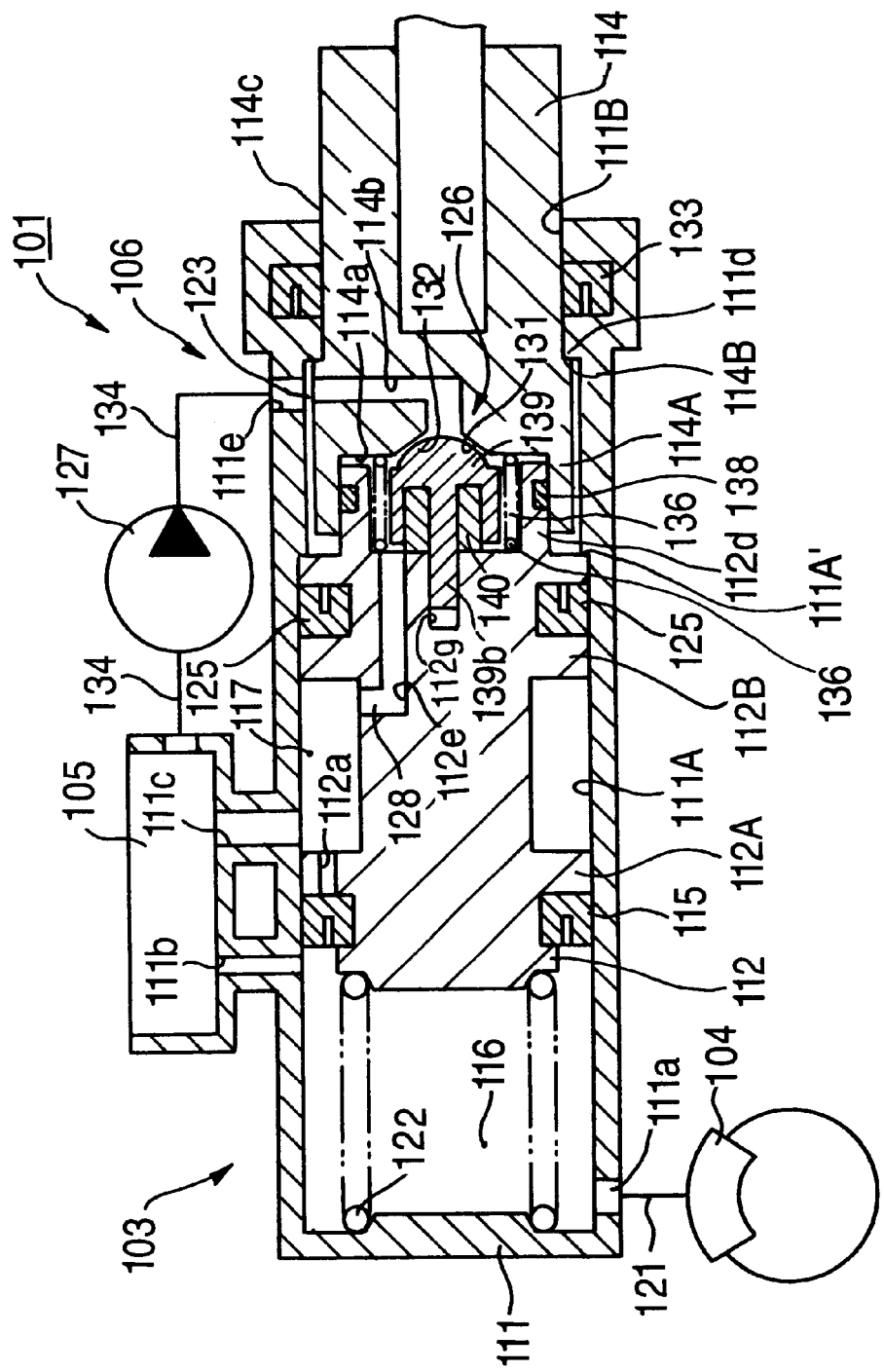
FIG. 8 is a cross section of an eighth embodiment of the invention.

An eighth embodiment shown in FIG. 8 corresponds to the second embodiment shown in FIG. 2 except that an increased diameter bore 111A of a housing 111 is formed with a forwardly facing, stepped surface 111A' toward the rear end thereof. In addition, an input shaft 114 is formed with a bottomed opening 114a, and a spring 136 is disposed between the bottom surface of the bottomed opening 114a and an opposing end face of a primary piston 112.

Furthermore in this embodiment, a valve member 139 is provided with a shank portion which is formed as a solid cylinder 139b, which is slidably fitted into a guide opening 112g formed in the end face of the primary piston 112. In this connection, there is provided a tubular resilient member 140, through which the solid cylinder 139b extends.

In the inoperative condition, the abutment of the rear end face of the primary piston 112 against the stepped surface 111A' defines the retracted end position of the primary piston 112 within the increased diameter bore 111A. The input shaft 114 has a stepped end face 114b which abuts against a stepped end face 111d of the housing 111. Under the inoperative condition, a valve element 132 is removed from a valve seat 131 to open a control valve 126, through which a communication is established between an intensifying chamber 123 and a reservoir 105 through a discharge passage 128.

In other respects, the arrangement is similar to that of the second embodiment shown in FIG. 2. In the eighth embodiment shown in FIG. 8, the control valve 126 is open in the inoperative condition, but as soon as the input shaft 114 is driven forward in response to the depression, the spring 136 is immediately compressed to close the control valve 126. A subsequent operation occurs in the similar manner as in the second embodiment shown in FIG. 2.

The eighth embodiment constructed in the manner mentioned above can achieve similar functioning and advantages as achieved by the second embodiment.

Ninth Embodiment

Figure 9:
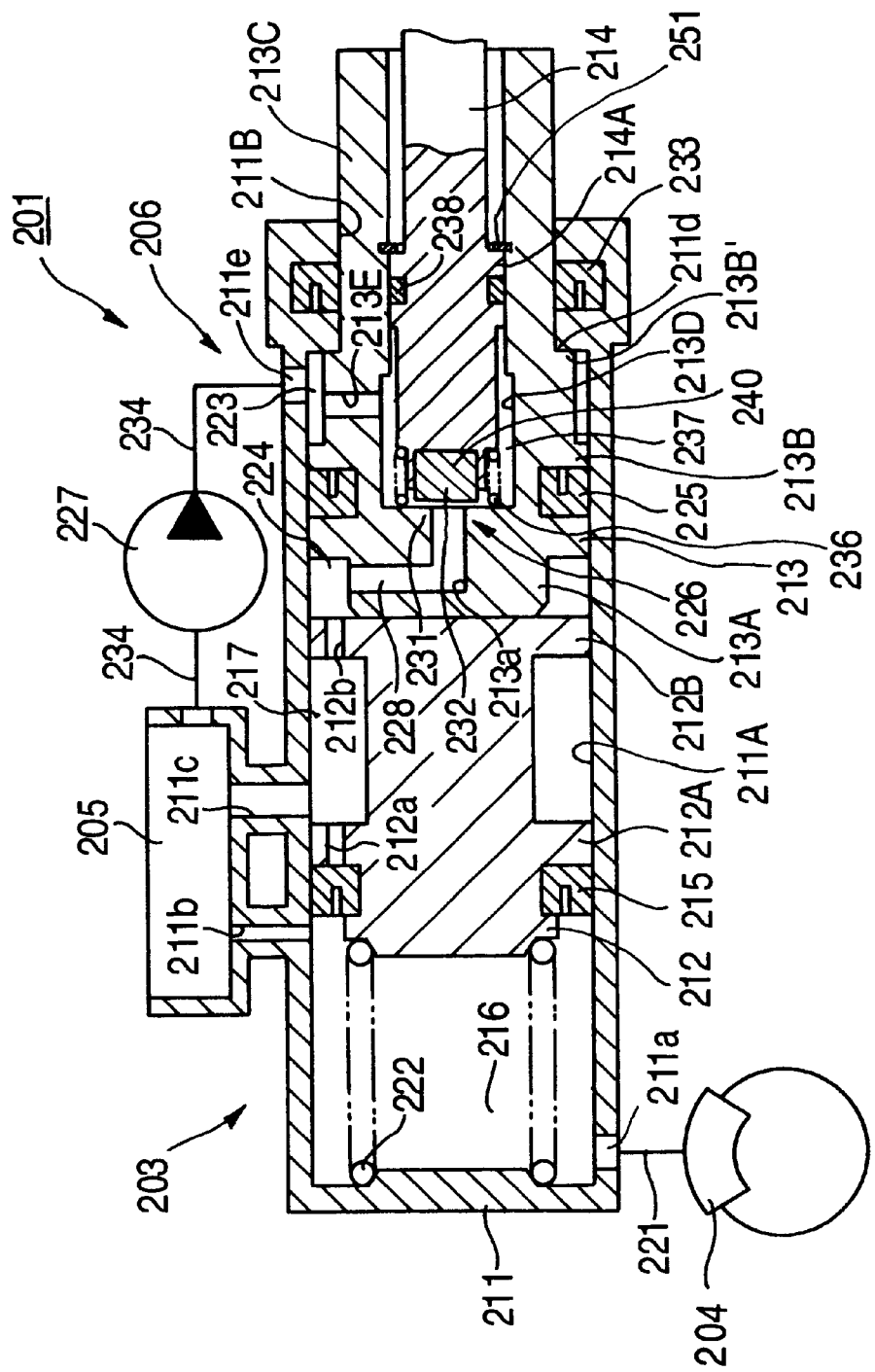
FIG. 9 is a cross section of a ninth embodiment of the invention.

FIG. 9 shows a ninth embodiment, which corresponds to the third embodiment shown in FIG. 3 except that a spring 236 is disposed between the outer periphery of an input shaft 214 toward the front end thereof and the bottom of the bottomed opening 213D formed in a thrust piston 213 and that a stop ring 251 is mounted at a given axial position in the bottomed opening 213D of the thrust piston 213. The abutment of a rear stepped end face of a portion 214A of an increased diameter of an input shaft 214 against the stop ring 251 defines a retracting end in the rearward direction of the input shaft 214 with respect to the thrust piston 213. In the inoperative condition, a valve element 232 is removed from a valve seat 231 to open a control valve 226, whereby a communication is established between an intensifying chamber 223 and a reservoir 205 through a discharge passage 228. In other respects, the arrangement is similar to that of the third embodiment shown in FIG. 3.

In the ninth embodiment shown in FIG. 9, the valve element 232 is removed from the valve seat 231 to open the control valve 226 in the inoperative condition, but as soon as the input shaft 214 is driven forward in response to the depression, the spring 236 is immediately compressed to close the control valve 326. A subsequent operation occurs in the similar manner as in the third embodiment shown in FIG. 3.

The ninth embodiment constructed in this manner can achieve similar functions and advantages as achieved by the first embodiment.

Tenth Embodiment

Figure 10:
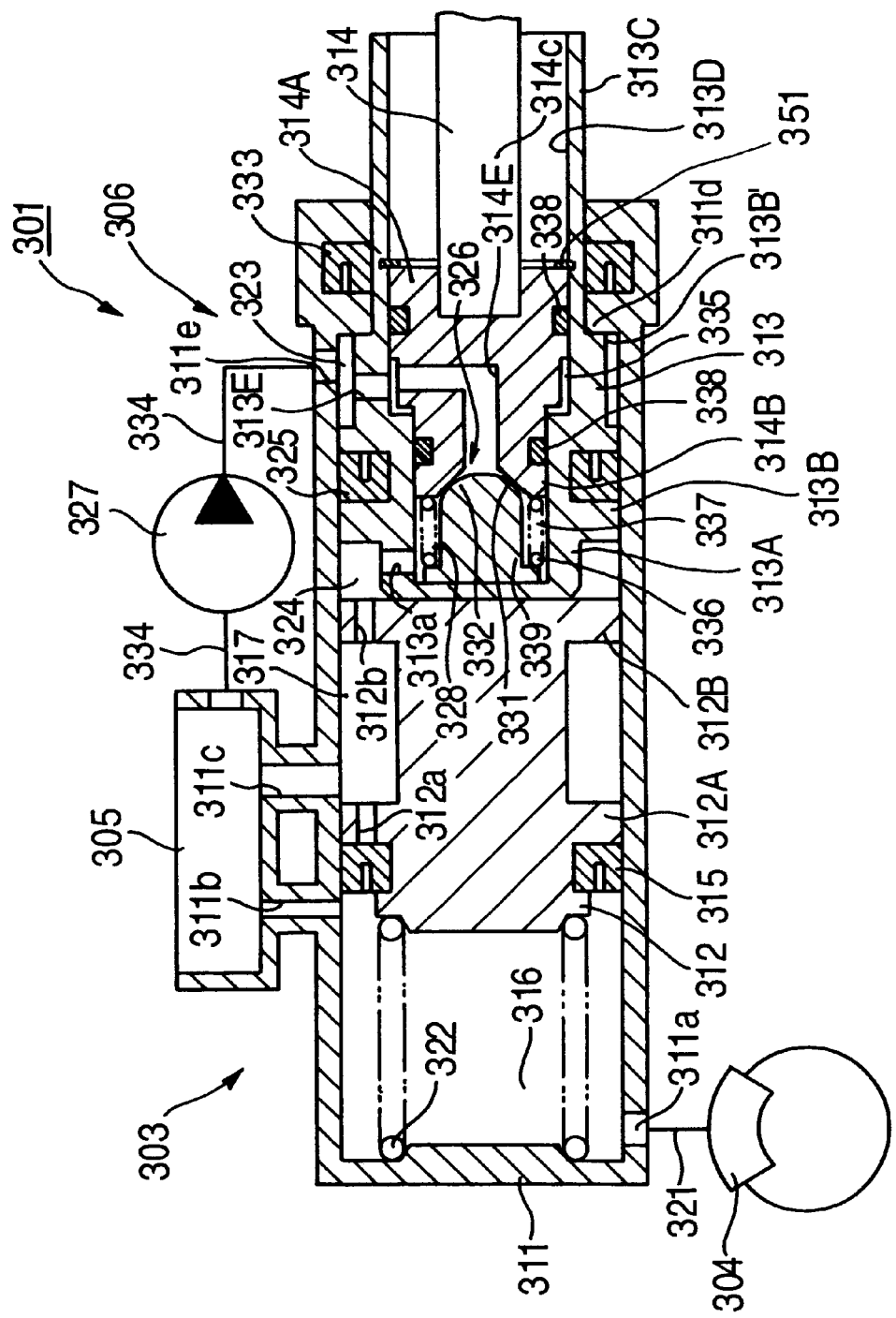
FIG. 10 is a cross section of a tenth embodiment of the invention.

A tenth embodiment shown in FIG. 10 corresponds to the fourth embodiment shown in FIG. 4 except that a stop ring 351 is mounted at a given axial position in a bottomed opening 313D of a thrust piston 313 so that a stepped end face of an increased diameter portion 314A of an input shaft 314 abuts against the stop ring 351. In this manner, the retracting end in the rearward direction of the input shaft 314 with respect to the thrust piston 313 is defined. In the inoperative condition, a valve element 332 is removed from a valve seat 331 to open a control valve 326, whereby a communication is established between an intensifying chamber 323 and a reservoir 305 through a discharge passage 328. In other respect, the arrangement is similar to that of the fourth embodiment shown in FIG. 4.

In the tenth embodiment shown in FIG. 10, the valve element 332 is removed from the valve seat 331 to open the control valve 326 in the inoperative condition, but as soon as the input shaft 314 is driven forward in response to the depression, a spring 336 is immediately compressed to close the control valve 326. A subsequent operation occurs in the similar manner as in the fourth embodiment shown in FIG. 4.

The tenth embodiment thus constructed can achieve similar functioning and advantages as achieved by the first embodiment.

Eleventh Embodiment

Figure 11:
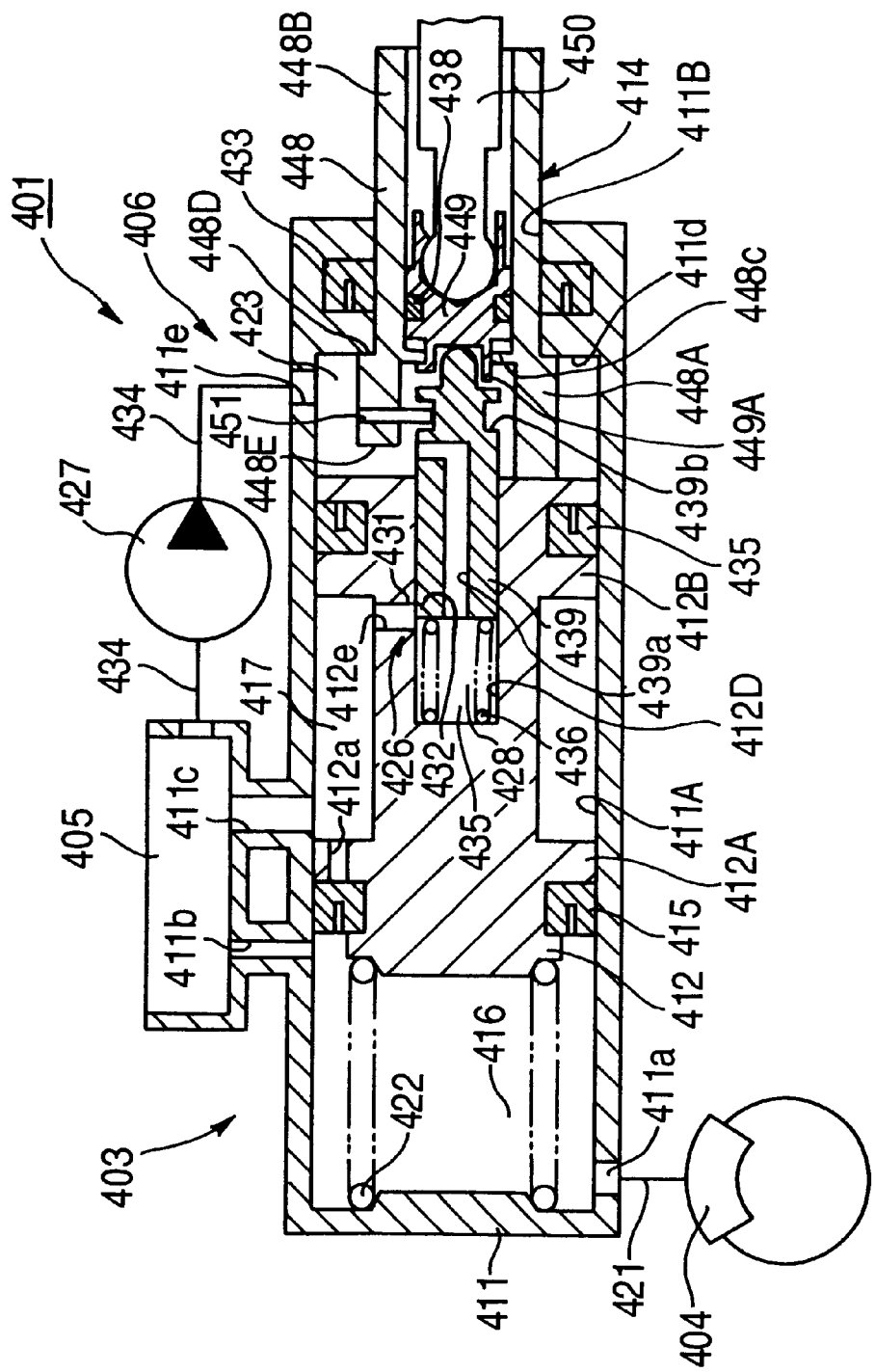
FIG. 11 is a cross section of an eleventh embodiment of the invention.

An eleventh embodiment shown in FIG. 11 corresponds to the fifth embodiment shown in FIG. 5 except that an input shaft 414 has an annular projection 448C of a reduced thickness (axial size), providing a clearance between the front end face of a solid cylinder member 449 and the rear end face of an annular projection 448C which corresponds to the reduction in the thickness. A relative movement is permitted between the solid cylinder member 449 and the tubular member 448 through an axial extent which corresponds to the axial size of the clearance. In the inoperative condition, a spool valve 439 is retracted rearwardly by an amount corresponding to the axial size of the clearance as compared with the fifth embodiment shown in FIG. 5, and the spool valve 439 has a valve element 432 which overlaps a valve seat 431 to open a control valve 426, whereby a communication is established between an intensifying chamber 423 and a reservoir 405 through a discharge passage 428. In other respects, the arrangement is similar to that of the fifth embodiment shown in FIG. 5.

In the eleventh embodiment shown in FIG. 11, the valve element 432 overlaps the valve seat 431 (the opening of a communication path 412e) to open the control valve 426 in the inoperative condition, but as a brake pedal is depressed, the solid cylinder member 449 and the spool valve 439 are initially driven forward relative to the tubular member 448, and the outer periphery of the spool valve 439 closes the valve seat 431 (the opening of a communication path 412e). A subsequent operation occurs in the similar manner as in the fifth embodiment shown in FIG. 5.

The eleventh embodiment thus constructed can achieve similar functioning and advantages as achieved by the first embodiment.

Twelfth Embodiment

Figure 12:
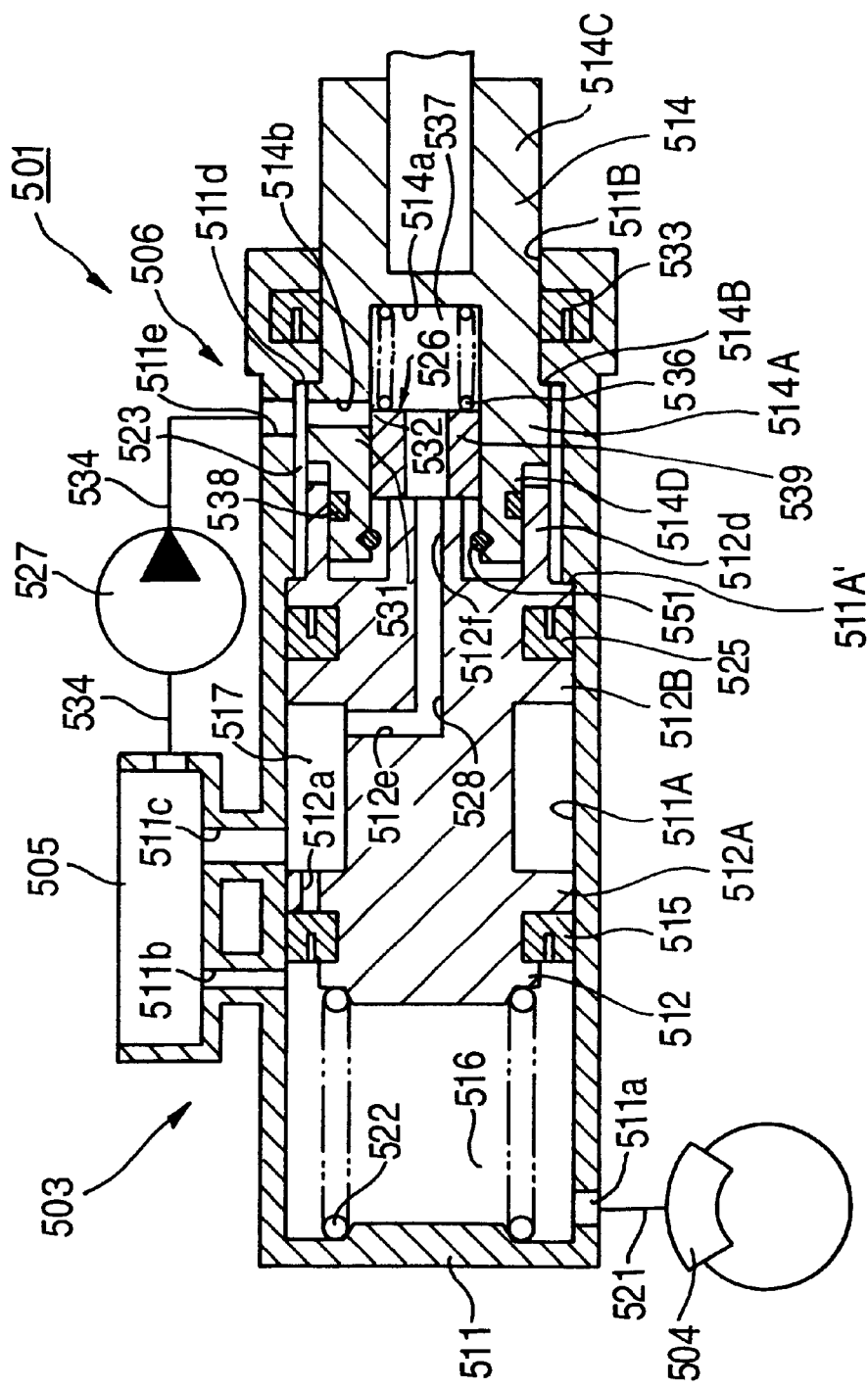
FIG. 12 is a cross section of a twelfth embodiment of the invention.

A twelfth embodiment shown in FIG. 12 corresponds to the sixth embodiment shown in FIG. 6 except that an increased diameter bore 511A of a housing 511 is formed with a forwardly facing stepped end face 511A', which may be abutted by an end face of a second flange 512B of a primary piston 512. In this manner, the retracting end position of the primary piston 512 within the increased diameter 511A is defined, and an end face 514B of an increased diameter portion 514A of an input shaft 514 abuts against a stepped end face 511d of the housing 511 to define the retracting end position of the input shaft 514. In this manner, in the inoperative condition, a clearance is maintained between the free end of a tubular portion 512d of the primary piston 512 and an opposing stepped end face of the input shaft 514. As compared with the sixth embodiment shown in FIG. 6, a spool valve 539 assumes a relatively advanced position with respect to the input shaft 514 in the inoperative condition to open a control valve 526, whereby a communication is established between an intensifying chamber 523 and a reservoir 505 through a discharge passage 528. In other respects, the arrangement is similar to that of the sixth embodiment shown in FIG. 6.

In the twelfth embodiment, a valve element 532 is removed from a valve seat 531 (the opening of a communication path 514b) to open a control valve 526 in the inoperative condition, but as soon as the brake pedal is depressed, the free end of the tubular portion 512d of the primary piston 512 abuts against the stepped end face of the inputs shaft 514, and the outer periphery of the spool valve 539 toward the rear end thereof closes the valve seat 531 (the opening of the communication path 514b). A subsequent operation occurs in the similar manner as in the sixth embodiment shown in FIG. 6.

The twelfth embodiment thus constructed can achieve similar functioning and advantages as achieved by the first embodiment. It will be noted that in the seventh to the twelfth embodiment, the control valve 26 (126, 226, 326, 426 or 526) is open in the inoperative condition to allow a communication between the intensifying chamber 23 (123, 223, 323, 423 or 523) and the reservoir 5 (105, 205, 305, 405 or 505). Accordingly, if the pump 27 (127, 227, 327, 427 or 527) is operated inadvertently, the liquid pressure in the intensifying chamber 23 (123, 223, 323, 423 or 523) can be maintained at the atmospheric pressure reliably in the inoperative condition.

In the first, the third, the fourth, the seventh, the ninth, and the tenth embodiment, the primary piston 12 (212 or 312) and the thrust piston 13 (213 or 313) are separate from each other, but the primary piston 12 (212 or 312) and the thrust piston 13 (213 or 313) may be integral to form an integral primary piston 12 (212 or 312). In such instance, similar functioning and advantages can be obtained as in the described embodiments. In the second, the fifth, the sixth, the eighth, the eleventh and the twelfth embodiment, the primary piston 112 (412 or 512) may be split into two parts in the axial direction, with the rear portion being used as a thrust piston in which the discharge passage 128 (428 or 528) may be formed and around which the second cup seal 125 (425 or 525) may be mounted. Again, similar functioning and advantages are obtained as in the described embodiments.

While the embodiments have been described for a direct coupling between the input shaft and the brake pedal, a brake booster may be interposed between the input shaft and the brake pedal. In this instance, the input shaft will be driven forward by an output shaft of the brake booster. When such an arrangement is used, a greater braking force can be obtained when intensifying means (pump) is activated. With such an arrangement, if a source of pressure associated with the brake booster fails, detecting means may be provided which detects this to operate a controller in accordance with a result of such detection to activate the intensifying means, thereby allowing a satisfactory braking force of a required magnitude to be obtained.

Above embodiments have been described when the present invention is applied to a master cylinder associated with a primary piston disposed within the housing. However, the invention is also applicable to a master cylinder of tandem type in which a primary piston and a secondary piston are both disposed within the housing.

While the invention has been described above in connection with several embodiments thereof, it should be understood that a number of changes, modifications and substitutions therein are possible from the above disclosure without departing from the spirit and scope of the invention defined by the appended claims.

What is claimed is:

1. A master cylinder comprising a master cylinder piston slidably fitted into a housing for generating a master cylinder pressure, a thrust piston slidably fitted into the housing and disposed in abutment against a rear side of the master cylinder piston, an intensifying chamber defined within the housing at a location rearward of the thrust piston, an input shaft adapted to be driven back and forth in interlocked relationship with a brake operating member, a source of liquid pressure which is brought into communication with the intensifying chamber when required, a discharge passage for providing communication between the intensifying chamber and a reservoir for discharging an operating liquid in the intensifying chamber into the reservoir, and a control valve responsive to the input shaft for causing a liquid pressure to be generated in the intensifying chamber in accordance with an input from the input shaft by regulating a discharge of the operating liquid from the intensifying chamber into the reservoir through the discharge passage, wherein the discharge passage normally communicates with the reservoir and defines an opening disposed in a rear side shaft part of the thrust piston and facing toward the intensifying chamber, the opening defining a valve seat, the valve seat and a valve element provided at a front end of the input shaft together forming the control valve.

2. A master cylinder according to claim 1, wherein the control valve closes the discharge passage in an inoperative condition where the input shaft is not driven forward.

3. A master cylinder according to claim 1, wherein the control valve opens the discharge passage in an inoperative condition where the input shaft is not driven forward.

4. A master cylinder according to claim 1, wherein the control valve comprises a resilient member which urges the valve element in a direction to open the discharge passage.

5. A master cylinder according to claim 1, in which the discharge passage is defined by a path provided in the thrust piston, an annular passage defined between the thrust piston and the master cylinder piston and an annular chamber defined between the external peripheral surface of the master cylinder piston and the internal peripheral surface of the housing.

6. A master cylinder according to claim 1 wherein the valve element is semi-spherical and the valve seat is a conical recess defined in the rear side of the thrust piston.

7. A master cylinder according to claim 1 wherein the opening of the discharge passage opens directly into the intensifying chamber.

8. A master cylinder according to claim 1 wherein the front end of the input shaft is disposed within the intensifying chamber and the opening of the discharge passage opens into the intensifying chamber and defines the valve seat which cooperates with the valve element provided on the front end of the input shaft.

9. A master cylinder comprising a master cylinder piston slidably fitted into a housing for generating a master cylinder pressure, a thrust piston slidably fitted into the housing and disposed in abutment against the rear side of the master cylinder piston, an intensifying chamber defined within the housing at a location rearward of the thrust piston, an input shaft adapted to be driven back and forth in interlocked relationship with a brake operating member, a source of liquid pressure which is brought into communication with the intensifying chamber when required, a discharge passage for providing communication between the intensifying chamber and a reservoir for discharging an operating liquid in the intensifying chamber into the reservoir, and a control valve responsive to the input shaft for causing a liquid pressure to be generated in the intensifying chamber in accordance with an input from the input shaft by regulating a discharge of the operating liquid from the intensifying chamber into the reservoir through the discharge passage, the thrust piston and the input shaft being slidably engaged with each other while maintaining a liquid tightness therebetween, a valve chamber being defined between the thrust piston and the input shaft, a first passage providing communication between the valve chamber and the intensifying chamber and a second passage normally providing communication between the valve chamber and the reservoir, the first and second passages and the valve chamber together defining a rear portion of the discharge passage, the second passage defining an opening in the thrust piston which faces rearwardly and defines a valve seat, and a valve element disposed in the valve chamber which cooperates with the valve seat to open and close the opening of the second passage.

10. A master cylinder according to claim 9 wherein the thrust piston has a portion of a reduced diameter toward the rear end thereof which slidably extends through a rear end of the housing while maintaining a liquid tightness therebetween, the input shaft being slidably engaged with the portion of a reduced diameter while maintaining a liquid tightness therebetween.

11. A master cylinder according to claim 9, wherein the control valve closes the discharge passage in an inoperative condition where the input shaft is not driven forward.

12. A master cylinder according to claim 9, wherein the control valve opens the discharge passage in an inoperative condition where the input shaft is not driven forward.

13. A master cylinder according to claim 9, wherein the control valve comprises a resilient member which urges the valve element in a direction to open the discharge passage.

14. A master cylinder according to claim 9, wherein the valve element is provided on the input shaft.

15. A master cylinder according to claim 9, in which the discharge passage is defined by a path provided in the thrust piston, an annular passage defined between the thrust piston and the master cylinder piston and an annular chamber defined between the external peripheral surface of the master cylinder piston and the internal peripheral surface of the housing.

16. A master cylinder according to claim 9 wherein the valve element comprises a cylindrical elastic member provided on an end of the input shaft.

17. A master cylinder comprising a master cylinder piston slidably fitted into a housing for generating a master cylinder pressure therein, an intensifying chamber defined in the housing at a location rearward of the master cylinder piston, an input shaft adapted to be driven back and forth in interlocked relationship with a brake operating member, a source of liquid pressure which is brought into communication with the intensifying chamber when required, a discharge passage for providing communication between the intensifying chamber and a reservoir for discharging an operating liquid in the intensifying chamber into the reservoir, and a control valve for causing a liquid pressure to be generated in the intensifying chamber in accordance with an input from the input shaft by regulating a discharge of the operating liquid from the intensifying chamber into the reservoir through the discharge passage, the master cylinder piston and the input shaft being slidably engaged with each other while maintaining a liquid tightness therebetween, a valve chamber being defined between the master cylinder piston and the input shaft, a first passage providing communication between the valve chamber and the intensifying chamber and a second passage normally providing communication between the valve chamber and the reservoir, the first and second passages and the valve chamber together defining a rear portion of the discharge passage, the first passage defining an opening adjacent the valve chamber and disposed in the input shaft so as to face forwardly, and a valve element disposed in the valve chamber for opening and closing the opening of the first passage.

18. A master cylinder according to claim 17, wherein the control valve comprises a valve seat which is formed on the input shaft.

19. A master cylinder according to claim 17, in which the control valve includes a valve seat provided on the input shaft and defined by the opening of the first passage and the valve element which is provided in the valve chamber.

20. A master cylinder according to claim 17 wherein the control valve opens the discharge passage in an inoperative condition where the input shaft is not driven forward.

21. A master cylinder according to claim 17 wherein the control valve comprises a resilient member which urges the valve element in a direction to open the discharge passage.

22. A master cylinder according to claim 17 wherein the valve element is semi-spherical and the opening of the first passage defines a valve seat which is a conical recess defined in a front end of the input shaft.

23. A master cylinder comprising a master cylinder piston slidably fitted into a housing for generating a master cylinder pressure, a thrust piston slidably fitted into the housing and disposed in abutment against the rear side of the master cylinder piston, an intensifying chamber defined within the housing at a location rearward of the thrust piston, an input shaft adapted to be driven back and forth in interlocked relationship with a brake operating member, a source of liquid pressure which is brought into communication with the intensifying chamber when required, a discharge passage for providing communication between the intensifying chamber and a reservoir for discharging an operating liquid in the intensifying chamber into the reservoir, and a control valve responsive to the input shaft for causing a liquid pressure to be generated in the intensifying chamber in accordance with an input from the input shaft by regulating a discharge of the operating liquid from the intensifying chamber into the reservoir through the discharge passage, the thrust piston and the input shaft being slidably engaged with each other while maintaining a liquid tightness therebetween, a valve chamber being defined between the thrust piston and the input shaft, a first passage providing communication between the valve chamber and the intensifying chamber and a second passage normally providing communication between the valve chamber and the reservoir, the first and second passages and the valve chamber together defining a rear portion of the discharge passage, the first passage defining an opening adjacent the valve chamber and disposed in the input shaft so as to face forwardly, and a valve element disposed in the valve chamber for opening and closing the opening of the first passage.

24. A master cylinder according to claim 23, in which the control valve includes a valve seat provided on the input shaft and defined by the opening of the first passage and the valve element which is provided in the valve chamber.

25. A master cylinder according to claim 23 wherein the thrust piston has a portion of a reduced diameter toward the rear end thereof which slidably extends through a rear end of the housing while maintaining a liquid tightness therebetween, the input shaft being slidably engaged with the portion of reduced diameter while maintaining a liquid tightness therebetween.

26. A master cylinder according to claim 23 wherein the control valve closes the discharge passage in an inoperative condition where the input shaft is not driven forward.

27. A master cylinder according to claim 23 wherein the control valve opens the discharge passage in an inoperative condition where the input shaft is not driven forward.

28. A master cylinder according to claim 23 wherein the control valve comprises a resilient member which urges the valve element in a direction to open the discharge passage.

29. A master cylinder according to claim 23 wherein the discharge passage is defined by a path provided in the thrust piston, an annular passage defined between the thrust piston and the master cylinder piston and an annular chamber defined between the external peripheral surface of the master cylinder piston and the internal peripheral surface of the housing.

30. A master cylinder according to claim 23 wherein the valve element is semi-spherical and the opening of the first passage defines a valve seat which is a conical recess defined in a front end of the input shaft.

31. A master cylinder comprising a master cylinder piston slidably fitted into a housing for generating a master cylinder pressure therein, an intensifying chamber defined in the housing at a location rearward of the master cylinder piston, an input shaft adapted to be driven back and forth in interlocked relationship with a brake operating member, a source of liquid pressure which is brought into communication with the intensifying chamber when required, a discharge passage for providing communication between the intensifying chamber and a reservoir for discharging an operating liquid in the intensifying chamber into the reservoir, and a control valve for causing a liquid pressure to be generated in the intensifying chamber in accordance with an input from the input shaft by regulating a discharge of the operating liquid from the intensifying chamber into the reservoir through the discharge passage, a rear side shaft portion of the master cylinder piston defining a bottomed hole facing the intensifying chamber, a first passage disposed in the master cylinder piston and normally providing communication between the reservoir and the bottomed hole, the control valve including a spool valve slidably disposed in the bottomed hole for opening and closing an opening of the first passage at an inner end thereof, and a second passage disposed in the spool valve which normally provides communication between the bottomed hole and the intensifying chamber, the first and second passages and a space within the bottomed hole together forming a rear portion of the discharge passage.

32. A master cylinder according to claim 31 wherein the control valve closes the discharge passage in an inoperative condition where the input shaft is not driven forward.

33. A master cylinder according to claim 31 wherein the control valve opens the discharge passage in an inoperative condition where the input shaft is not driven forward.

34. A master cylinder according to claim 31 wherein the control valve comprises a resilient member which urges the spool valve in a direction to open the discharge passage.

35. A master cylinder according to claim 31 wherein the spool valve is cylindrical, and the spool valve and the input shaft are relatively movable a predetermined distance in the axial direction.

36. A master cylinder according to claim 31 wherein the spool valve includes an axially extending outer peripheral surface which slidably engages an axially extending inner peripheral surface of the master cylinder piston which defines the bottomed hole, the opening of the first passage opening through the inner peripheral surface of the bottomed hole, the spool valve being movable between a position wherein the outer peripheral surface thereof overlaps the opening of the first passage to close off same and a position wherein the outer peripheral surface is spaced from the opening to open the first passage.

37. A master cylinder according to claim 31 wherein the first passage is oriented generally radially within the master cylinder piston, the second passage has a rear end which opens into the intensifying chamber and a front end which opens into the space of the bottomed hole, the space comprising a spring chamber defined between a front end face of the spool valve and an end wall of the bottomed hole disposed in opposed relation with the front end face, the control valve including a spring disposed within the spring chamber which biases the spool valve rearwardly into engagement with the input shaft, an outer end of the first passage opening into an annular chamber defined between an outer peripheral surface of the master cylinder piston and an inner peripheral surface of the housing, the annular chamber communicating with the reservoir, the annular chamber, the first passage, the spring chamber and the second passage together defining the discharge passage.

38. A master cylinder comprising a master cylinder piston slidably fitted into a housing for generating a master cylinder pressure therein, an intensifying chamber defined in the housing at a location rearward of the master cylinder piston, an input shaft adapted to be driven back and forth in interlocked relationship with a brake operating member, a source of liquid pressure which is brought into communication with the intensifying chamber when required, a discharge passage for providing communication between the intensifying chamber and a reservoir for discharging an operating liquid in the intensifying chamber into the reservoir, and a control valve for causing a liquid pressure to be generated in the intensifying chamber in accordance with an input from the input shaft by regulating a discharge of the operating liquid from the intensifying chamber into the reservoir through the discharge passage, a front shaft portion of the input shaft defining a bottomed hole which faces forwardly, a first passage disposed in the input shaft and normally providing communication between the intensifying chamber and the bottomed hole, a spool valve slidably disposed in the bottomed hole for opening and closing an opening of the first passage at an inner end thereof, and a second passage disposed in the master cylinder piston and providing communication between the reservoir and the bottomed hole, the first and second passages, a space defined within the bottomed hole and a passage defined in the spool valve together forming a rear portion of the discharge passage.

39. A master cylinder according to claim 38, wherein the control valve closes the discharge passage in an inoperative condition where the input shaft is not driven forward.

40. A master cylinder according to claim 38, wherein the control valve opens the discharge passage in an inoperative condition where the input shaft is not driven forward.

41. A master cylinder according to claim 38 wherein the control valve comprises a resilient member which urges the spool valve in a direction to open the discharge passage.

42. A master cylinder according to claim 38 wherein the spool valve is cylindrical in shape.

43. A master cylinder according to claim 42 wherein the bottomed hole is cylindrical in shape and the spool valve has an axially extending outer periphery which slidably engages an axially extending inner periphery of the master cylinder piston which defines the bottomed hole, and the opening of the first passage opens through the inner periphery of the bottomed hole such that the spool valve is movable into axially overlapping relation with the opening to close same.

\* \* \* \* \*